(12) United States Patent
Hayashide

(10) Patent No.: US 6,801,375 B2
(45) Date of Patent: Oct. 5, 2004

(54) IMAGE FORMATION OPTICAL SYSTEM AND IMAGE READING APPARATUS USING THE SAME

(75) Inventor: Tadao Hayashide, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/423,878

(22) Filed: Apr. 28, 2003

(65) Prior Publication Data

US 2003/0214731 A1 Nov. 20, 2003

(30) Foreign Application Priority Data

| May 7, 2002 | (JP) | .................................... 2002-131590 |
| Jun. 20, 2002 | (JP) | .................................... 2002-179635 |
| Mar. 20, 2003 | (JP) | .................................... 2003-077767 |

(51) Int. Cl.[7] .................................................. G02B 7/02
(52) U.S. Cl. ........................ 359/819; 359/819; 359/694; 359/704
(58) Field of Search ................................ 359/819, 823, 359/694, 704, 821, 822, 830, 706, 754–756, 739, 740, 665

(56) References Cited

U.S. PATENT DOCUMENTS 5,270,857 A * 12/1993 Oizumi et al. ............... 359/554
5,898,527 A * 4/1999 Sawai et al. ................. 359/819
6,307,661 B1 * 10/2001 Fujibayashi et al. ......... 359/207
6,404,939 B1 * 6/2002 Wada .......................... 382/312
6,507,444 B2 * 1/2003 Hayashide et al. .......... 359/720

FOREIGN PATENT DOCUMENTS

| JP | P2000-171705 A | 6/2000 |
| JP | P2000-307823 A | 11/2000 |
| JP | P2000-307828 A | 11/2000 |
| JP | P2002-314765 A | 10/2002 |

* cited by examiner

Primary Examiner—Ricky Mack
Assistant Examiner—Brandi Thomas
(74) Attorney, Agent, or Firm—Fitzpatrick, Cella, Harper & Scinto

(57) ABSTRACT

To provide an image formation optical system which is excellent in image formation performance while reducing an opening angle of an anamorphic lens, and an image reading apparatus using the same. When a thickness of an anamorphic lens is $d_a$, a thickness of a meniscus lens arranged adjacent to the anamorphic lens is $d_m$, an interval between the anamorphic lens and the meniscus lens adjacent thereto is $t_{in}$, and a distance between a lens surface of the lens, of both the lenses, nearest an aperture stop, and a lens surface of the lens, other than both the lenses, facing that lens surface is $t_{out}$, the constituent elements are set so as to satisfy the following condition:

$$t_{in} < d_m + d_a < t_{out}.$$

21 Claims, 22 Drawing Sheets

IMAGE FORMATION OPTICAL SYSTEM AND IMAGE READING APPARATUS USING THE SAME

BACKGROUND OF THE INVENTION

1. Field of the Invention

The present invention relates in general to an image formation optical system and, an image reading apparatus using the same. In particular, the invention is suitable for an image reading apparatus such as an image scanner, a copying machine or a facsimile which is adapted to sufficiently exhibit the optical performance of an image formation optical system having a rotation asymmetric lens such as an anamorphic lens.

2. Related Background Art

FIG. 20 is a schematic view showing a construction of a main portion of a conventional image reading apparatus.

In the figure, reference numeral 92 designates an original table glass on the surface of which an original 91 is placed. Reference numeral 97 designates a carriage in which an illumination system 93, a plurality of reflecting mirrors 94a, 94b, 94c, 94d and 94e, an image formation optical system (image reading lens) 95, a reading unit 96, and the like all of which will be described later are integrally accommodated. Image information of the original 91 is read by scanning the carriage 97 in a sub-scanning direction indicated by an arrow in the figure by a sub-scanning mechanism 98 such as a motor. The image information which has been read is sent to a personal computer or the like as an external apparatus through an interface (not shown).

Reference numeral 93 designates an illumination system composed of a xenon tube, a halogen lamp, an LED array or the like. By the way, a reflecting plate such as an aluminium evaporation plate may be combined with the illumination system 93. Reference numerals 94a, 94b, 94c, 94d and 94e designate reflecting mirrors, respectively, which serve to fold optically the luminous flux from the original 91 in the inside of the carriage 97. Reference numeral 95 designates an image formation optical system which serves to image the light from the original 91 on the surface of the reading unit 96. Reference numeral 96 designates a linear sensor such as a CCD (Charge Coupled Device) as the reading unit which is constructed by arranging a plurality of light receiving elements in a main scanning direction as a direction perpendicular to the paper surface.

For miniaturization of the image scanner in the above-mentioned construction, the carriage 97 must be miniaturized. For miniaturization of the carriage 97, for example, there is a method of increasing the number of reflecting mirrors, or a method of reflecting the light plural times by one reflecting mirror to ensure an optical path length.

However, in these methods, there is encountered a problem in that since the internal construction of the carriage 97 becomes complicated, it becomes difficult to achieve accurate assembly and hence the cost is greatly increased. In addition, there is also encountered a problem in that the image formation performance becomes worse in proportion to the profile irregularity of the reflecting mirror and the number of times of reflection, which exerts an influence on the read image as well.

Then, the applicant of the present invention made such a proposal that in the formerly proposed image reading apparatus shown in the Japanese Patent Application Laid-Open No. 2000-171705, an anamorphic lens having at least one surface which is rotation asymmetric with respect to an optical axis is introduced into an image formation optical system to increase the field angle of the image formation optical system (image formation system) 97 to shorten the distance between object and image, thereby shortening the optical path length itself.

However, if the lens having the anamorphic surface is incorporated in the image formation optical system, then the image formation performance of the image formation optical system will become rotation asymmetric with respect to an optical axis. For this reason, the main scanning direction of the image formation optical system, and the direction of arrangement of a plurality of light receiving elements constituting a CCD of the image reading apparatus need to be controlled so as to be aligned with each other.

Various image reading apparatuses for fixing accurately the above-mentioned image formation optical system in the main scanning direction along which a CCD is arranged have been proposed Application Laid-Open No. 2000-307823 and Japanese Patent Registration No. 307,828 for example. In accordance with these references, the positional relationship among an anamorphic lens, a lens barrel and an image reading apparatus is accurately fixed.

In addition, there has been proposed, e.g., in Japanese Patent Application laid-Open No. 2002-314765, a method of maintaining the high image formation performance of the above-mentioned image formation system even under the conditions in which the temperature environment is severe.

However, these techniques described in these references have the following problems.

First of all, the description will hereinbelow be given with respect to a conventional image formation optical system 101 constituted only by rotation symmetric lenses with reference to FIG. 21. If rotation symmetric lenses a, b, c and d included in a lens barrel 100 are manufactured as designed, as shown in a shaded dot portion in the figure, the sufficient image formation performance is exhibited in the whole image formation area 105. However, as shown in the rotation symmetric lens c in the figure, in general, in the image formation optical system, the lens decentering occurs through the manufacture process. If the lens decentering occurs, then the image formation performance within the image formation surface becomes nonuniform. For this reason, in the image formation optical system 101 constituted by only the lenses each having the rotation symmetric shape, the lenses each having the rotation symmetric shape needs to be rotated with the optical axis as a center to carry out the adjustment indicated by an arrow in the figure (hereinafter, referred to as "the rotation adjustment") so that the best image formation line 104 having high image formation performance overlaps the direction of arrangement of a plurality of pixels of the CCD within the image formation area 105 (hereinafter, referred to as "the CCD arrangement direction").

Next, the description will hereinbelow be given with respect to a prior art using the rotation asymmetric lenses such as the anamorphic lenses with reference to FIG. 22.

In the figure, objects shown in the form of circles are lenses each having a rotation symmetric shape (rotation symmetric lenses) a, b, c and d, and an object shown in the form of a quadrilateral is a lens having a rotation asymmetric shape (rotation asymmetric lens) e. The main scanning direction of the rotation asymmetric lens e is indicated by a long broken line x in the quadrilateral. In the image formation optical system 101 using the rotation asymmetric lens e, the image formation area 105 becomes a flattening area determined by the rotation asymmetric lens e.

In this image formation optical system 101, when the lens decentering as exemplified by the rotation symmetric lens c occurs, the sufficient image formation performance can not be obtained. Even if the rotation adjustment is carried out, since both the best image formation line 104 and the image formation area 105 are rotated, there is a problem in that the CCD arrangement direction 106 and the best image formation line 104 are not necessarily aligned with each other.

Thus, for the image formation optical system 101 using the rotation asymmetric lens e, the molding accuracy, the assembly accuracy and the like of the lens barrel need to be rigidly managed so that a quantity of occurrence of the decentering becomes very small. Thus, that image formation optical system 101 can not be safely said as the image formation optical system which is excellent in mass production due to an increase in processing cost and a reduction in yield.

In addition, the above-mentioned problem is also the problem arising similarly due to the fact that even in the case of a lens having no anamorphic surface, if the lens concerned is the so-called flattening lens having the rotation asymmetric shape in outer diameter, then the image formation surface is flattened.

When the positional relationship between the anamorphic lens and the barrel is controlled, in actuality, there is a limit to the assembly accuracy, and hence the values provided through the assembly are difficult to perfectly coincide with the design values. Thus, a measure of an error occurs. In addition, with respect to the positional relationship as well between the barrel and the image reading apparatus, likewise, the mounting error occurs.

Thus, at least two errors occur in the alignment of the main scanning direction of the anamorphic lens and the main scanning direction of the image reading apparatus, and a quantity of error becomes unignorable in the field of the image reading apparatus requiring the high accuracy.

FIG. 23 is a cross sectional view of an image formation optical system OL using the anamorphic lens described in the Japanese Patent Application Laid-Open No. 2000-171705. FIG. 24 is a view useful in explaining the various aberrations in the image formation optical system OL. A surface R10 of the lens of the lenses shown in FIG. 23 is an anamorphic surface. For the anamorphic surface R10, an angle defined between a normal and an optical axis in the most outer peripheral portion through which a beam of light passes, i.e., the so-called opening angle reaches no less than 45°.

In the case where an anamorphic lens is made through the cutting processing using a cutting tool or the like, the frictional force applied to the cutting tool is further increased as the opening angle is increased, and hence the highly accurate processing can not be carried out. Also, in the case where an anamorphic lens is made through the glass mold or the plastic molding using a metallic mold, similarly to the foregoing, there is also a problem in that not only the processing accuracy of the metallic mold is poor but also the shape of the metallic mold can not be accurately transferred to the moldings.

In the measurement as well of the lens shape, a large frictional force is caused between a measuring probe and a lens surface, and hence not only the accurate measurement can not be carried out, but also the measuring probe may be damaged in some cases.

While the design for decreasing an opening angle has been attempted in order to solve the above-mentioned problems, correction for distortion aberration, coma aberration and the like can not be sufficiently carried out and hence it is impossible to maintain the high image formation performance.

SUMMARY OF THE INVENTION

In the light of the foregoing, the present invention has been made in order to solve the above-mentioned problems associated with the prior art, and it is therefore a first object of the present invention to provide an image formation optical system which is excellent in mass production due to a reduction in processing cost and an improvement in yield, and an image reading apparatus using the same.

It is a second object of the present invention to provide an image reading apparatus which is capable of exhibiting sufficiently the optical performance of an image formation optical system at least one surface of which has an anamorphic surface to read image information with high accuracy.

It is a third object of the present invention to provide an image formation optical system which is excellent in image formation performance while reducing an opening angle of an anamorphic lens, and an image reading apparatus using the same.

In order to attain the above-mentioned objects, according to one aspect of the present invention, an image formation optical system for imaging image information of an original on a photoelectric conversion device having a plurality of pixels arranged in one—dimensional direction is characterized in that a lens barrel for holding at least one of rotation symmetric lens having a shape which is rotation symmetric with respect to an optical axis, and a lens barrel for holding a rotation asymmetric lens having a rotation asymmetric shape are assembled so as to be mutually rotatable for adjustment.

According to another further aspect of the present invention, an image formation optical system for imaging image information of an original on a photoelectric conversion device having a plurality of pixels arranged in one-dimensional direction includes: at least one of rotation symmetric lens having a shape which is rotation symmetric with respect to an optical axis and held inside a lens barrel; and a rotation asymmetric lens having a rotation asymmetric shape and held outside the lens barrel, and in the image formation optical system, the at least one of rotation symmetric lens and the rotation asymmetric lens are assembled so as to be mutually rotatable for adjustment.

Incidentally, according to the above-mentioned image formation optical system, it is preferable that the rotation asymmetric lens has a flattening shape in outer diameter.

Further, according to the above-mentioned image formation optical system, it is preferable that the rotation asymmetric lens has an anamorphic surface in optical surface shape.

According to another further aspect of the present invention, an image reading apparatus for imaging image information of an original on a photoelectric conversion device having a plurality of pixels arranged in one-dimensional direction using the above-mentioned image formation optical system to read the image information is characterized in that one direction of a refracting power of a rotation asymmetric lens of the image formation optical system is aligned with the direction of arrangement of the plurality of pixels of the photoelectric conversion device.

According to another further aspect of the present invention, an image reading apparatus includes: an image formation optical system for imaging image information of an original; a barrel for holding the image formation optical system; barrel supporting means for supporting the barrel; and reading means arranged in an image formation position of the image formation optical system and having a plurality of light receiving elements arranged in one-dimensional direction, and in the image reading apparatus, the image formation optical system has at least one of rotation asymmetric lens having a rotation asymmetric shape, and a second alignment reference surface provided in the rotation asymmetric lens is brought into contact with a first alignment reference surface provided in the barrel supporting means to align certain one direction of a refracting power of the rotation asymmetric lens with the direction of arrangement of the plurality of light receiving elements.

Incidentally, according to the above-mentioned image reading apparatus, it is preferable that the second alignment reference surface is a flat surface portion provided in a part of the outer peripheral portion of the rotation asymmetric lens, and the first alignment reference surface is a flat surface portion provided in a part of the barrel supporting means.

Further, according to the above-mentioned image reading apparatus, it is preferable that one of the alignment reference surfaces is a protruding portion, and the other of the alignment reference surfaces is a groove portion adapted to be engaged with the protruding portion.

Further, according to the above-mentioned image reading apparatus, it is preferable that a fourth alignment reference surface provided in the rotation asymmetric lens is brought into contact with a third alignment reference surface provided in the barrel supporting means to align a direction perpendicular to the certain one direction of the refracting power of the rotation asymmetric lens with the direction of arrangement of the plurality of light receiving elements.

According to still another further aspect of the present invention, an image formation optical system for imaging image information of an original on a photoelectric conversion device having a plurality of pixels arranged in one-dimensional direction is characterized in that the image formation optical system has an aperture stop, at least one of lens of a plurality of lenses constituting the image formation optical system is an anamorphic lens, and a meniscus lens is arranged adjacent to the anamorphic lens, and when a thickness of the anamorphic lens is $d_a$, a thickness of the meniscus lens is $d_m$, an interval between the anamorphic lens and the meniscus lens adjacent thereto is $t_{in}$, and a distance between a lens surface of the lens of both the lenses nearest the aperture stop and a lens surface of the lens, other than both the lenses, facing the lens surface of the lens of both the lenses nearest the aperture stop is $t_{out}$, the following condition is satisfied:

$$t_{in} < d_m + d_a < t_{out}.$$

Further, according to the above-mentioned image formation optical system, it is preferable that a maximum opening angle in a ray passing area of the anamorphic lens is equal to or smaller than 40°.

Further, according to the above-mentioned image formation optical system, it is preferable that when a focal length of a main scanning cross section of the image formation optical system is $f_{all}$, and a maximum outer diameter of a ray passing area of the anamorphic lens is K, the following relationship is established:

$$0.3 \leq K/f_{all} \leq 1.5.$$

Further, according to the above-mentioned image formation optical system, it is preferable that the meniscus lens adjacent to the anamorphic lens is a meniscus-shaped lens having a negative refracting power and having a recess surface directed to the aperture stop side.

Further, according to the above-mentioned image formation optical system, it is preferable that a refracting power within a main scanning cross section of an anamorphic surface of the anamorphic lens, and a refracting power within a sub-scanning cross section thereof are changed within an effective range, and when a differences between maximum values of the refractive power and minimum values of the refractive power are $\Delta\Phi_m$ and $\Delta\psi_s$, respectively, the following condition is satisfied:

$$0.008 < \Delta\Phi_m < 0.045 \text{ and } 0.000 < \Delta\Phi_s < 0.012.$$

Further, according to the above-mentioned image formation optical system, it is preferable that when a focal length of a main scanning cross section of the image formation optical system is $f_{all}$, a focal length of the meniscus lens is $f_m$, and a focal length of a main scanning cross section of the anamorphic lens is $f_a$, the following condition is satisfied:

$$-1.65 < \frac{f_m}{f_{all}} < -1.20 \text{ and } 4.0 < \left|\frac{f_a}{f_m}\right| < 13.5$$

Further, according to the above-mentioned image formation optical system, it is preferable that the image formation optical system includes: a meniscus-shaped first lens having a positive refracting power and having a convex surface directed to an original side; a second lens having recess surfaces as both lens surfaces; a third lens having convex surfaces as both lens surfaces; a meniscus-shaped fourth lens having a negative refracting power and having a recess surface directed to the original side; a meniscus-shaped fifth lens having a recess surface directed to the original side; and a meniscus-shaped sixth lens having a recess surface directed to the original side in this order from the original side, and that the anamorphic lens is at least one of lens of a plurality of meniscus-shaped lenses.

Further, according to the above-mentioned image formation optical system, it is preferable that the image formation optical system includes: a meniscus-shaped first lens having a positive refracting power and having a convex surface directed to an original side; a second lens having recess surfaces as both lens surfaces; a third lens having convex surfaces as both lens surfaces; a meniscus-shaped fourth lens having a recess surface directed to the original side; and a meniscus-shaped fifth lens having a recess surface directed to the original side, and that the anamorphic lens is at least one of lens of a plurality of meniscus-shaped lenses.

Further, according to the above-mentioned image formation optical system, it is preferable that the anamorphic lens is made of plastic mold, and the meniscus lens is made of glass.

According to still another further aspect of the present invention, an image reading apparatus is characterized by forming image information on a surface of reading means using the above-mentioned image formation optical system.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiments of the present invention will hereinafter be described in detail with reference to the accompanying drawings.

(First Embodiment)

Figure 1:
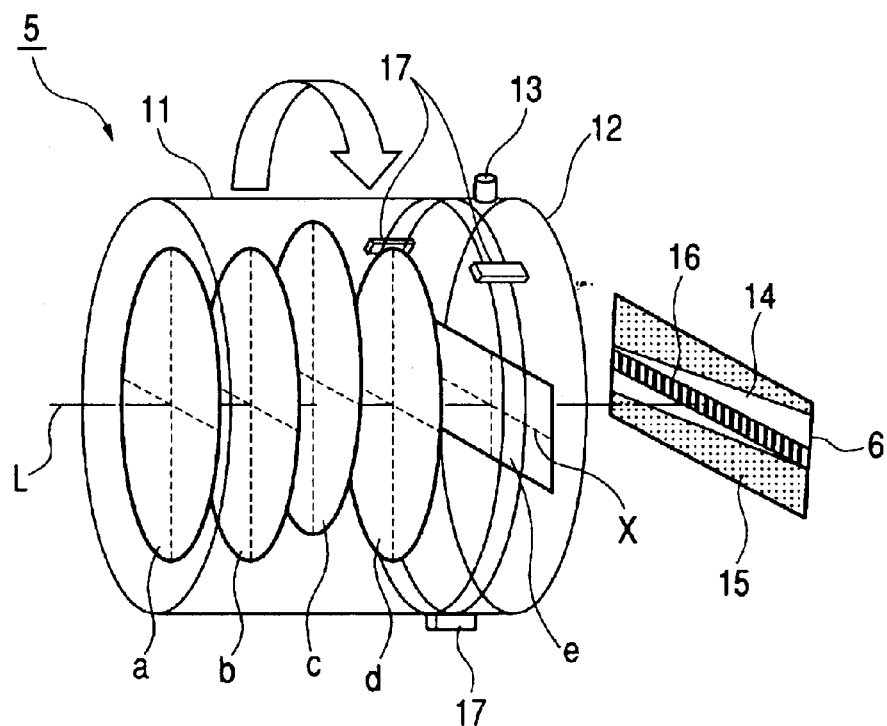
FIG. 1 is a schematic view showing construction of a main portion of an image formation optical system according to a first embodiment of the present invention.

FIG. 1 is a perspective view of a main portion showing an image formation optical system in a first embodiment of the present invention, and a direction of arrangement of a plurality of pixels of a photoelectric conversion device (CCD)(CCD arrangement direction) constituting one element of an image reading apparatus.

In FIG. 1, reference numeral 5 designates an image formation optical system in which a first lens barrel 11 for directly holding rotation symmetric lenses a, b, c and d which are rotation symmetric (shown in the form of circles) with respect to an optical axis L (hereinafter referred to as "rotation symmetric lenses"), and a second lens barrel 12 for directly holding a rotation asymmetric lens e having a rotation asymmetric shape (shown in the form of a quadrilateral)(hereinafter referred to as "rotation asymmetric lens") are assembled so as to be mutually rotatable for adjustment. The above-mentioned first and second lens barrels 11 and 12 are joined to be integrated with each other. The rotation asymmetric lens e has a flattening shape in its outer diameter, and its optical surface is formed of an anamorphic surface. Note that the main scanning direction of the rotation asymmetric lens e is indicated by a long broken line x in the quadrilateral.

Reference numeral 6 designates a photoelectric conversion device composed of a line sensor (CCD) in which a plurality of pixels for capturing image information of an original in the form of a one-dimensional image are arranged in one-dimensional direction (main scanning direction).

In this embodiment, the rotation asymmetric lens e is aligned in its rotation direction with the second lens barrel 12 with an optical axis L as a reference, and also the second lens barrel 12 is aligned with the image reading apparatus main body by a alignment portion 13. Accordingly, the alignment is carried out so that one direction (main scanning direction) of a refracting power of the rotation asymmetric lens e is aligned with the CCD arrangement direction (main scanning direction) of the image reading apparatus.

The first lens barrel 11 and the second lens barrel 12 can be assembled through the mutual rotation with the optical axis L as the reference axis by a rotation adjustment mechanism 17.

In this embodiment, when the lens decentering occurs in the manufacture process as exemplified by the rotation symmetric lens c, in the state in which the second lens barrel 12 is held fixed so that the CCD arrangement direction 16 is located in the center of the image formation area 15, the rotation of the first lens barrel 11 is adjusted so that the best image formation line 14 due to the lens decentering overlaps the CCD arrangement direction 16. After completion of the adjustment, the first lens barrel 11 and the second lens barrel 12 are integrated with each other by means of adhesion or the like. As a result, in this embodiment, the image formation optical system is realized which is excellent in mass production due to a reduction in processing cost and an improvement in yield as compared with the conventional image formation optical system using a rotation asymmetric lens.

Note that, in this embodiment, even in the case of the lens having no anamorphic surface, if it is the so-called flattening lens having a rotation asymmetric shape in its outer diameter, the present invention can be applied thereto.

(Second Embodiment)

Figure 2:
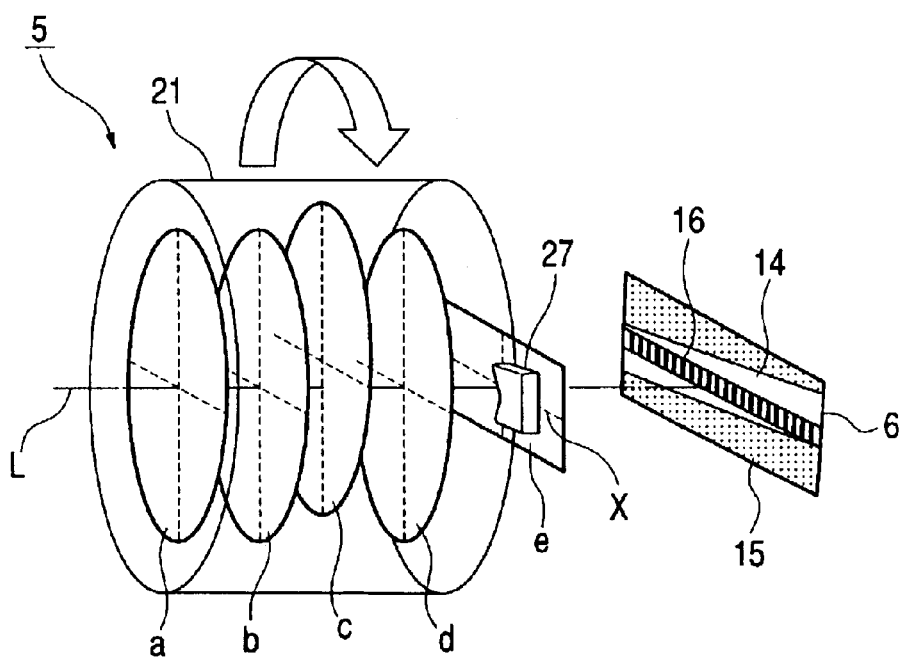
FIG. 2 is a schematic view showing construction of a main portion of an image formation optical system according to a second embodiment of the present invention.

FIG. 2 is a perspective view of a main portion showing an image formation optical system in a second embodiment of the present invention, and the CCD arrangement direction. In the figure, the same constituent elements as those shown in FIG. 1 are designated with the same reference numerals.

A point of difference of this embodiment from the above-mentioned first embodiment is that the rotation symmetric lenses a, b, c and d held inside a single lens barrel 21 and the rotation asymmetric lens e held outside the lens barrel 21 are assembled so as to be mutually rotatable for adjustment. Other construction and the optical function are substantially the same as those in the first embodiment. Thus, the same effects are provided.

That is, in the figure, reference numeral 5 designates an image formation optical system in which the rotation symmetric lenses a, b, c and d exemplified in the form of circles inside the single lens barrel 21, and the rotation asymmetric lens e exemplified in the form of a quadrilateral outside the lens barrel 21 are assembled so as to be mutually rotatable for adjustment. Note that, the main scanning direction of the rotation asymmetric lens e is indicated by a long broken line x in the quadrilateral.

The rotation asymmetric lens e in this embodiment is aligned with the image reading apparatus main body by an alignment portion (not shown). Thus, the alignment is carried out so that one direction (main scanning direction) of the refracting power of the rotation asymmetric lens e is aligned with the CCD arrangement direction (main scanning direction) 16 of the image reading apparatus.

The lens barrel 21, the rotation symmetric lenses a, b, c and d, and the rotation asymmetric lens e can be assembled through the mutual rotation with the optical axis L as the reference axis by a rotation adjustment mechanism 27.

In this embodiment, when the lens decentering occurs through the manufacture process as exemplified by the rotation symmetric lens c, after the rotation asymmetric lens e is fixed so that the CCD arrangement direction 16 is located in the center of the image formation area 15, the rotation of the lens barrel 21 is adjusted so that the best image formation line 14 due to the lens decentering overlaps the CCD arrangement direction 16. After completion of the adjustment, the lens barrel 21 and the rotation asymmetric lens e are fixed to each other by means of adhesion or the like. As a result, in this embodiment, the image formation optical system is realized which is excellent in mass production due to a reduction in processing cost and an improvement in yield as compared with the conventional image formation optical system using a rotation asymmetric lens.

(Third Embodiment)

Figure 3:
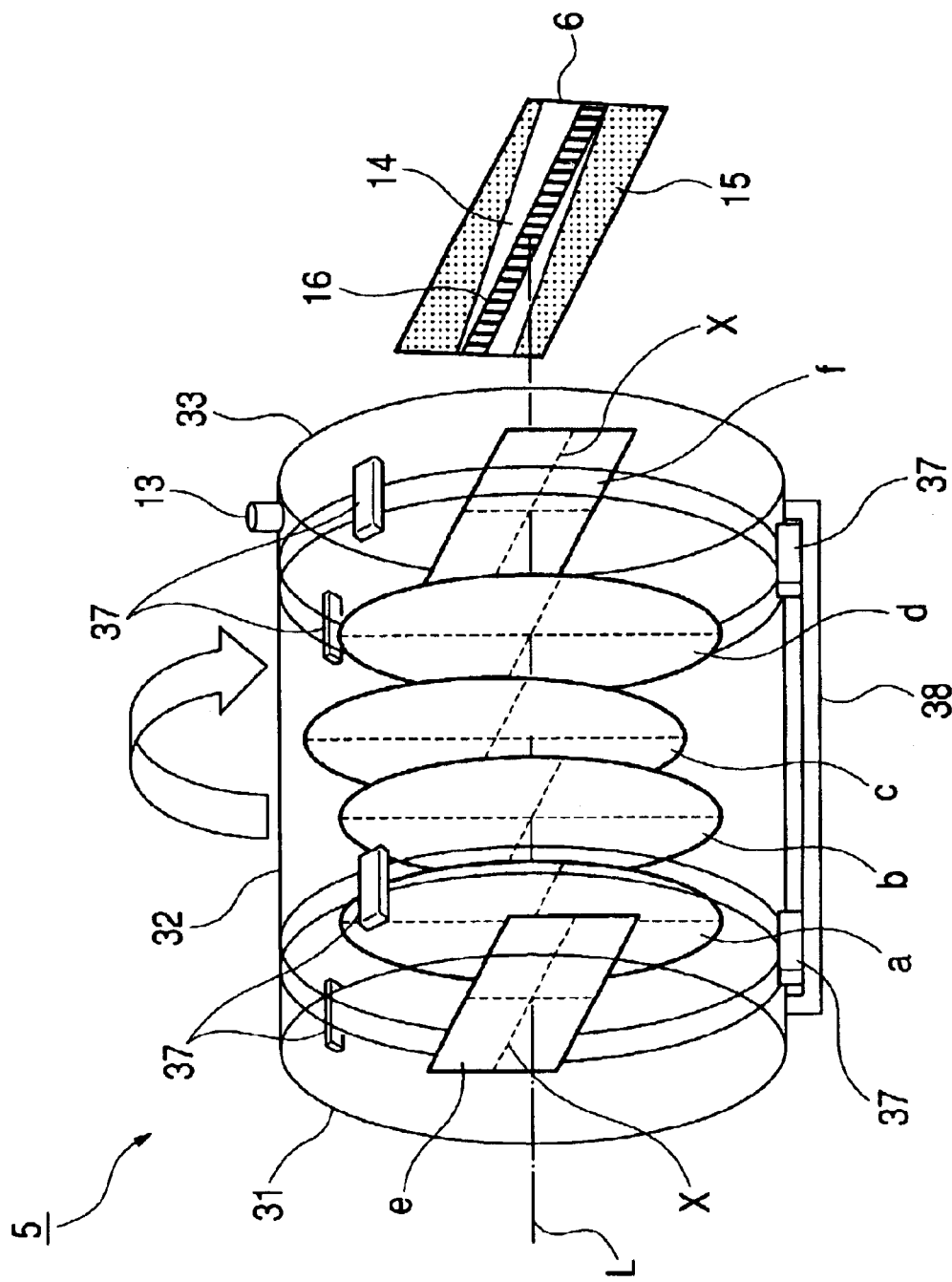
FIG. 3 is a schematic view showing construction of a main portion of an image formation optical system according to a third embodiment of the present invention.

FIG. 3 is a perspective view of a main portion showing an image formation optical system in a third embodiment of the present invention, and the CCD arrangement direction. In the figure, the same constituent elements as those shown in FIG. 1 are designated with the same reference numerals.

A point of difference of this embodiment from the above-mentioned first embodiment is that a second lens barrel 32 for directly holding the rotation symmetric lenses a, b, c and d, and first lens barrel 31 and third lens barrel 33 joined to the second lens barrel 32 for directly holding the rotation asymmetric lenses e and f, respectively, are assembled so as to be mutually rotatable for adjustment. Other construction and the optical function are substantially the same as those in the first embodiment. Thus, the same effects are provided.

That is, in the figure, reference numeral 5 designates an image formation optical system in which the second lens barrel 32 for directly holding the rotation symmetric lenses a, b, c and d exemplified in the form of circles, and the first lens barrel 31 and the third lens barrel 33 joined to the second lens barrel 32 for directly holding the rotation asymmetric lenses e and f exemplified in the form of quadrilaterals, respectively, are assembled so as to be mutually rotatable for adjustment. Note that the main scanning direction of the rotation asymmetric lenses e and f is indicated by a long broken line x in the quadrilateral.

In this embodiment, the first lens barrel 31 for directly holding the rotation asymmetric lens e, and the third lens barrel 33 for directly holding the rotation asymmetric lens f are fixed in positional relationship by a bonding member 38. In addition, by a rotation adjustment mechanism 37, the rotation asymmetric lens e is aligned with the first lens barrel 31 in rotation direction having the optical axis L as the reference, and the rotation asymmetric lens f is aligned with the third lens barrel 33 in rotation direction having the optical axis L as the reference. In addition, the third lens barrel 33 is aligned with the image reading apparatus main body by the alignment portion 13. Thus, the alignment is carried out so that one direction (main scanning direction) of the refracting powers of the two rotation asymmetric lenses e and f is aligned with the CCD arrangement direction (main scanning direction) 16 of the image reading apparatus.

The first lens barrel 31 and the third lens barrel 33, and the second lens barrel 32 can be assembled through the mutual rotation with the optical axis L as the reference axis.

In this embodiment, when the lens decentering occurs through the manufacture process as exemplified by the rotation symmetric lens c, in the state in which the first lens barrel 31 and the third lens barrel 33 are held fixed so that the CCD arrangement direction 16 is located in the center of the image formation area 15, the rotation of the second lens barrel 32 is adjusted so that the best image formation line 14 due to the lens decentering overlaps the CCD arrangement direction 16. After completion of the adjustment, the first lens barrel 31, the second lens barrel 32 and the third lens barrel 33 are integrated with one another by means of adhesion or the like. As a result, in this embodiment, the image formation optical system is realized which is excellent in mass production due to a reduction in processing cost and an improvement in yield as compared with the conventional image formation optical system using a rotation asymmetric lens.

(Fourth Embodiment)

Figure 4:
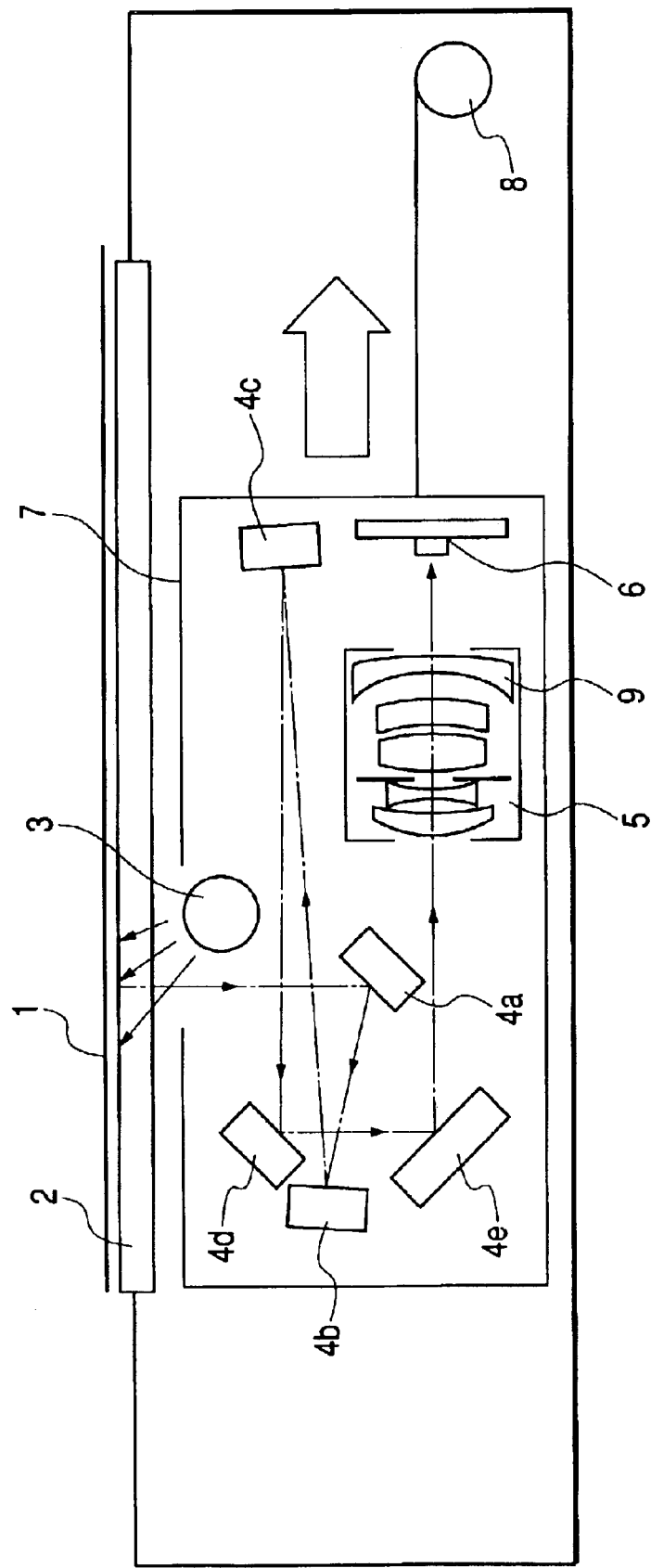
FIG. 4 is a schematic view showing construction of a main portion of an image reading apparatus according to a first embodiment of the present invention.
Figure 5:
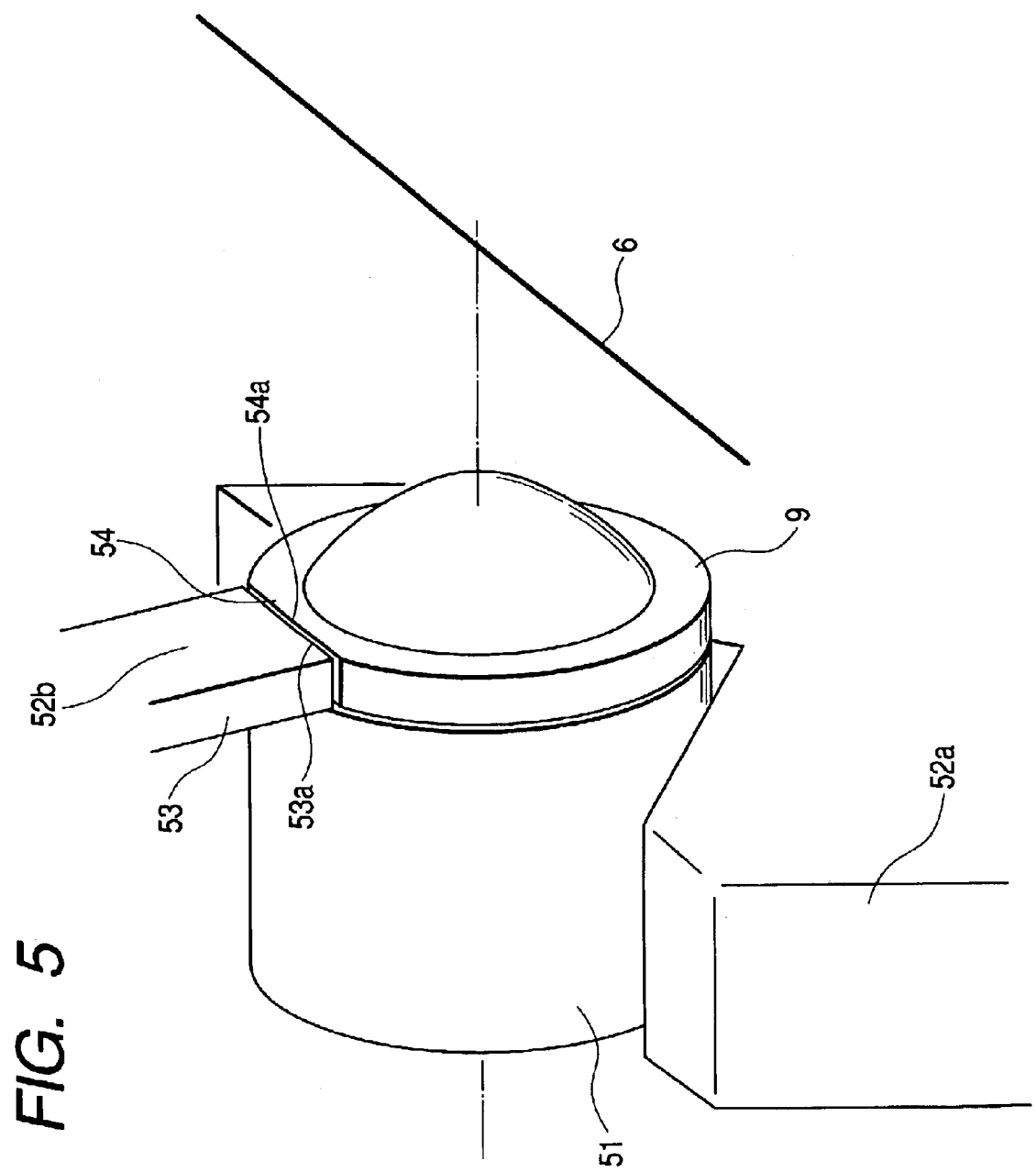
FIG. 5 is a perspective view of a main portion showing a positional relationship among the image formation optical system in the second embodiment of the present invention, an image reading apparatus and a CCD.

FIG. 4 is a schematic view showing construction of a main portion of a fourth embodiment when the image reading apparatus of the present invention is applied to an image forming apparatus such as an image scanner or a copying machine, and FIG. 5 is a perspective view of a main portion showing a positional relationship between a peripheral portion of the image formation optical system and a reading unit (CCD) of FIG. 4.

In the figure, reference numeral 2 designates an original table glass on the surface of which an original 1 is placed. Reference numeral 7 designates a carriage in which an illumination system 3, a plurality of reflecting mirrors 4a, 4b, 4c, 4d and 4e, the image formation optical system 5, the reading unit 6 and the like all of which will be described later are integrally received. Then, the image information of the original 1 is read by scanning the carriage 7 in the sub-scanning direction (indicated by an arrow) by a sub-scanning mechanism 8 such as a sub-scanning motor.

The illumination system 3 is composed of a xenon barrel, a halogen lamp, an LED array or the like. Note that a reflecting plate such as an aluminium evaporation plate may be combined with the illumination system 3. The reflecting mirrors 4a, 4b, 4c, 4d and 4e are first reflecting mirror, second reflecting mirror, third reflecting mirror, fourth reflecting mirror and fifth reflecting mirror, respectively, and serve to optically fold an optical path of the luminous flux from the original 1 inside the carriage 7.

The image formation optical system 5 images the luminous flux based on the image information of the original 1 on the surface of the reading unit 6. The image formation optical system 5 in this embodiment has an anamorphic lens 9. Alignment portions 53 and 54 which are arranged on the image reading apparatus side and on the anamorphic lens side, respectively, and which serve to directly align certain one direction (main scanning direction) of the refracting power of the anamorphic lens 9 with the arrangement direction (main scanning direction) of a plurality of light receiving elements of the reading unit 6 are provided in a barrel supporting portion 52 for supporting barrel 51 for holding the image formation optical system 5, and the anamorphic lens 9, respectively. The alignment portion 54 provided on the anamorphic lens 9 side is a flat surface portion 54a provided in a part of the outer peripheral portion of the anamorphic lens 9, and the alignment portion 53 provided on the barrel supporting portion 52 side is a flat surface portion 53a provided in a part of the barrel supporting portion 52.

The reading unit 6 is composed of a line sensor (CCD: Charge Coupled Device) and has a plurality of light receiving elements arranged in one-dimensional direction (main scanning direction).

In this embodiment, the luminous flux radiated from the illumination system 3 illuminates the original 1 directly or indirectly through a reflector (not shown), and the optical path of the luminous flux of the reflected light from the original 1 is optically folded inside the carriage 7 through the first reflecting mirror 4a, the second reflecting mirror 4b, the third reflecting mirror 4c, the fourth reflecting mirror 4d and the fifth reflecting mirror 4e to be imaged on the surface of the CCD 6 by the image formation optical system 5. Then, the carriage 7 is moved in the direction indicated by an arrow (sub-scanning direction) by the sub-scanning motor 8 to read the image information of the original 1. Then, the image information thus read is sent to a personal computer or the like as an external apparatus through an interface (not shown).

The image formation optical system 5 in this embodiment, as shown in FIG. 5, is arranged on the barrel supporting portion 52a on the image reading apparatus side, the anamorphic surface of the anamorphic lens 9 is exposed to the outside of the barrel 51, and a part of its peripheral portion forms the flat surface portion 54a as the alignment portion 54. The flat surface portion 54a comes into contact with the flat surface portion 53a as the alignment portion 53 on the image reading apparatus side without through the barrel 51, whereby one direction (main scanning direction) of the refracting power of the anamorphic lens 9 can be aligned with the direction along which a plurality of light receiving elements of the CCD are arranged in one-dimensional direction (hereinafter referred to as "CCD arrangement direction").

An assembly worker places the barrel 51 on the barrel supporting portion 52a on the image reading apparatus side to adjust the general direction by the visual observation and then mounts the barrel supporting portion 52b, whereby one direction (main scanning direction) of the refracting power of the anamorphic lens 9 can be aligned with the CCD arrangement direction.

As described above, the feature of this embodiment is that the alignment portion 54 on the anamorphic lens 9 side is the flat surface portion 54a provided in a part of the peripheral portion of the anamorphic lens 9, and the alignment portion 53 on the barrel supporting portion 52 side corresponds to the flat surface portion 53a provided in a part of the barrel supporting portion 52. The construction has the superior advantages in that both the alignment portion 53 on the anamorphic lens side and the alignment portion 54 on the image reading apparatus side are simple in construction, easy in processing and excellent in mass production.

As described above, in this embodiment, the alignment portions for directly aligning certain one direction (main scanning direction) of the refracting power of the anamorphic lens 9 with the CCD arrangement direction are provided in the barrel supporting portion 52b and the anamorphic lens 9, respectively, whereby the error in arrangement of the barrel 51 can be disregarded, and the image reading apparatus of this embodiment sufficiently exhibits the optical performance of the image formation optical system to read the image information with high accuracy as compared with the conventional image reading apparatus.

Note that, in this-embodiment, alignment portions for directly aligning the direction (sub-scanning direction) perpendicular to certain one direction (main scanning direction) of the refracting power of the anamorphic lens 9 with the direction of arrangement of a plurality of light receiving elements may be provided in the anamorphic lens 9 and the barrel supporting portion 52b, respectively, in order to carry out the alignment.

The barrel supporting portions 52a and 52b may be separated from each other as shown in this embodiment, or may be arranged adjacent to each other so that one direction (main scanning direction) of the refracting power of the anamorphic lens 9 is aligned with the CCD arrangement direction at the same time that the barrel is placed.

In addition, in this embodiment, in the case where the anamorphic lens 9 is a cylindrical lens, a certain direction (one direction) of the refracting power and the direction of arrangement of a plurality of light receiving elements can be applied to the alignment. In addition, in the case where there are a plurality of sheets of anamorphic lenses, the alignment may be applied to the lens having the highest sensitivity (the rate of change in optical characteristics due to the positional error) of these lenses.

(Fifth Embodiment)

Figure 6:
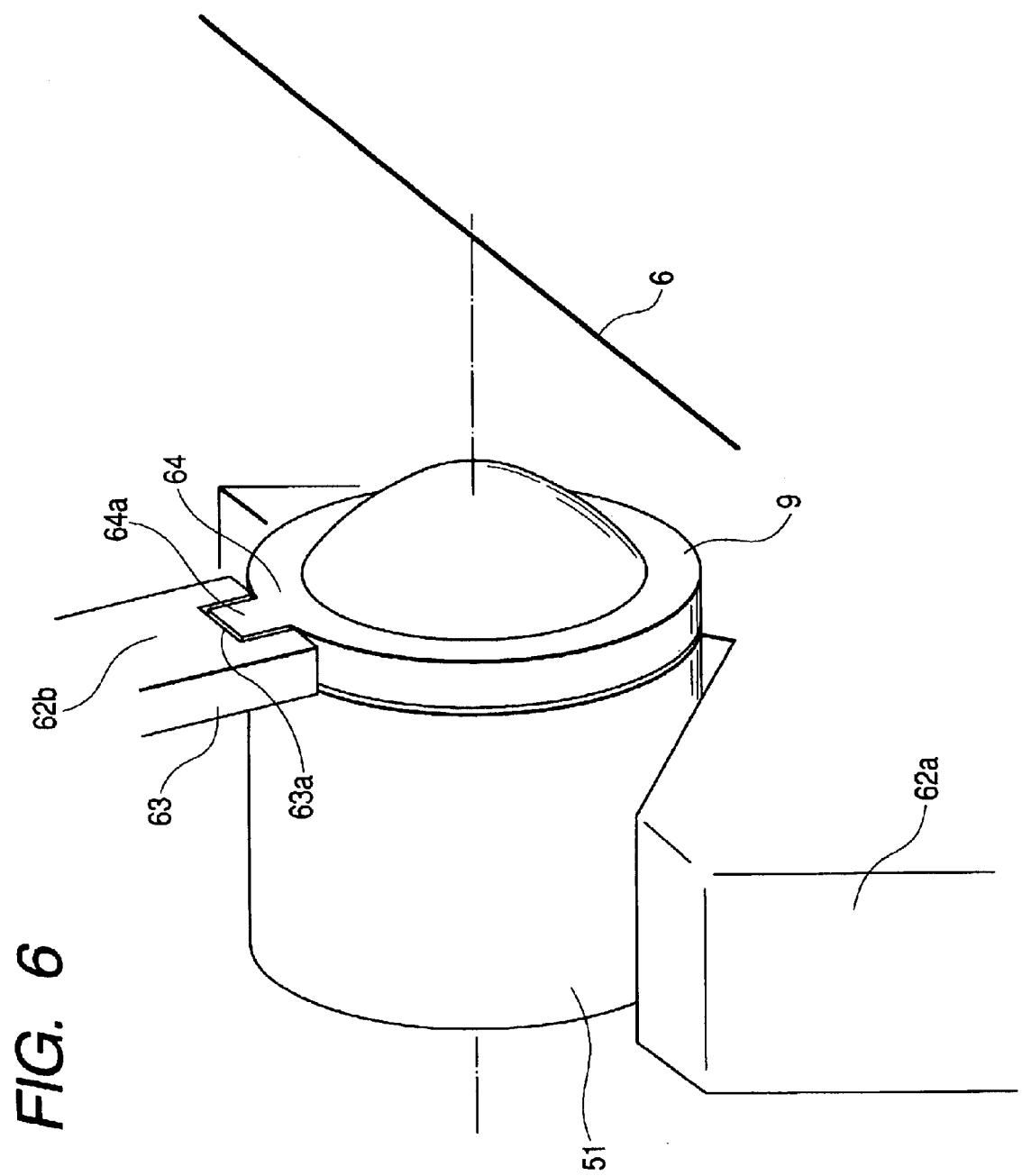
FIG. 6 is a perspective view of a main portion showing the positional-relationship among the image formation optical system in the third embodiment of the present invention, the image reading apparatus and the CCD.

FIG. 6 is a perspective view of a main portion showing the positional relationship between the peripheral portion of the image formation optical system and the CCD in a fifth embodiment of the present invention. In the figure, the same constituent elements as those shown in FIG. 5 are designated with the same reference numerals.

A point of difference of this embodiment from the above-mentioned fourth embodiment is that an alignment portion 64 on the anamorphic lens 9 side is made to be a protruding portion (projection portion) 64a provided in a part of the outer peripheral portion of the anamorphic lens 9, and an alignment portion 63 on the barrel supporting portion 62 side is made to be a groove portion 63a provided in a part of the barrel supporting portion 62 so that the groove portion 63a and the protruding portion 64a are engaged with each other. Other construction and the optical function are substantially the same as those in the fourth embodiment. Thus, the same effects are provided.

That is, the image formation optical system 5, as shown in FIG. 6, is arranged on a barrel supporting portion 62 on the image reading apparatus side, the anamorphic surface of the anamorphic lens 9 is exposed to the outside of the barrel 51, and a part of its peripheral portion becomes the protruding portion 64a as the alignment portion 64. The protruding portion 64a is engaged with the groove portion 63a as the alignment portion 63 on the image reading apparatus side without through the barrel 51 to allow one direction (main scanning direction) of the refracting power of the anamorphic lens 9 to be aligned with the CCD arrangement direction.

An assembly worker places the barrel 51 on the barrel supporting portion 62a on the image reading apparatus side to adjust the general direction through the visual observation, and then mounts the barrel supporting portion 62b, whereby one direction (main scanning direction) of the refracting power of the anamorphic lens 9 can be aligned with the CCD arrangement direction.

As described above, the feature of this embodiment is that the alignment portion 64 on the anamorphic lens 9 side is the protruding portion 64a provided in a part of the outer peripheral portion of the anamorphic lens 9, and the alignment portion 63 on the barrel supporting portion 62 side is the groove portion 63a provided in a part of the barrel supporting portion 62 and adapted to be engaged with the protruding portion 64a. This construction has the superior advantage in that when the outer peripheral portion of the anamorphic lens 9 and the ray passing area are near with each other, there is no need for shaving the optical surface. In addition, there is also the superior advantage in that since there is no need for coming into contact with the radial direction, an unnecessary pressure is not applied to the image formation optical system 5.

As described above, in this embodiment, the alignment portions adapted to directly align one direction (main scanning direction) of the refracting power of the anamorphic lens 9 with the CCD arrangement direction are provided in the barrel supporting portion 62 and the anamorphic lens 9, respectively, whereby the error in arrangement of the barrel 51 can be disregarded, and the image reading apparatus of this embodiment can sufficiently exhibit the optical performance of the image formation optical system to read image information with high accuracy.

(Sixth Embodiment)

Figure 7:
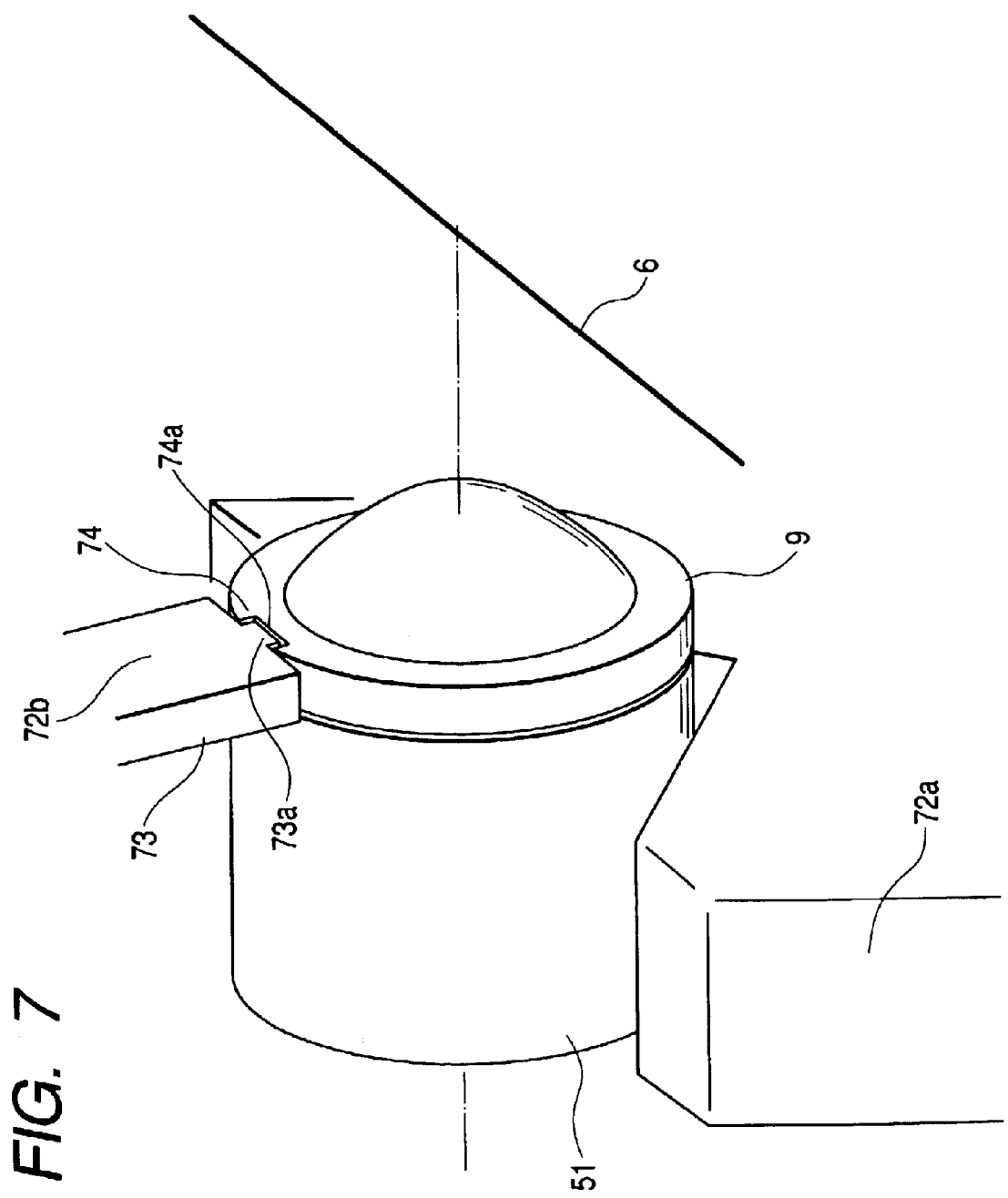
FIG. 7 is a perspective view of a main portion showing the positional relationship among the image formation optical system in the third embodiment of the present invention, the image reading apparatus and the CCD.

FIG. 7 is a perspective view of a main portion showing the positional relationship between the peripheral portion of the image formation optical system, and the CCD in a sixth embodiment of the present invention. In the figure, the same constituent elements as those shown in FIG. 5 are designated with the same reference numerals.

A point of difference of this embodiment from the above-mentioned fourth embodiment is that an alignment portion 73 on a barrel supporting portion 72 side is made to be a protruding portion 73a formed in a part of the barrel supporting portion 72, and an alignment portion 74 on the anamorphic lens 9 side is made to be a groove portion 74a provided in a part of the outer peripheral portion of the anamorphic lens 9 so that the groove portion 74a and the protruding portion 73a are engaged with each other. Other construction and the optical function are substantially the same as those in the fourth embodiment. Thus, the same effects are provided.

That is, the image formation optical system 5, as shown in FIG. 7, is arranged on the barrel supporting portion 72 on the image reading apparatus side, the anamorphic surface of the anamorphic lens 9 is exposed to the outside of the barrel 51, and a part of its outer peripheral portion becomes the groove portion 74a as the alignment portion 74. The groove portion 74a is engaged with the protruding portion 73a as the alignment portion 73 on the image reading apparatus side without through the barrel 51 to allow one direction (main scanning direction) of the refracting power of the anamorphic lens 9 to be aligned with the CCD arrangement direction.

An assembly worker places the barrel 51 on the barrel supporting portion 72a on the image reading apparatus side to adjust the general direction through the visual observation, and then mounts the barrel supporting portion 72b to allow one direction (main scanning direction) of the refracting power of the anamorphic lens 9 to be aligned with the CCD arrangement direction.

As described above, the feature of this embodiment is that the alignment portion 73 on the barrel supporting portion 72 side is the protruding portion 73a formed in a part of the barrel supporting portion 72, and the alignment portion 74 on the anamorphic lens 9 side is the groove portion 74a provided in a part of the outer peripheral portion of the anamorphic lens 9 and adapted to be engaged with the protruding portion 73a. This construction has the superior advantages in that the volume of the anamorphic lens 9 can be reduced, and the lens material can be saved. In addition, there is also the superior advantage in that there is no need for coming into contact with the radial direction similarly to the fifth embodiment, an unnecessary pressure is not applied to the image formation optical system 5.

As described above, in this embodiment, the alignment portions adapted to directly align one direction (main scanning direction) of the refracting power of the anamorphic lens 9 with the CCD arrangement direction are provided in the barrel supporting portion 72 and the anamorphic lens 9, respectively, whereby the error in arrangement of the barrel 51 can be disregarded, and the image reading apparatus of this embodiment can sufficiently exhibit the optical performance of the image formation optical system 5 to read the image information with high accuracy.

(Seventh Embodiment)

FIGS. 8 to 12 are respectively lens cross sectional views of image formation optical systems according to first to fifth numerical embodiments of the present invention which will be described later, and FIGS. 13 to 17 are respectively views useful in explaining various aberrations (spherical aberration, astigmatism, distortion aberration, and chromatic aberration of magnification) of the image formation optical systems according to the first to fifth numerical embodiments of the present invention which will be described later.

In each of the lens cross sectional views, on the drawing, the left-hand side is the enlargement side (having the longer conjugate point) and the original surface OB side (the side having a read image provided thereon), and the right-hand side is the reduction side (having the shorter conjugate point) and the image surface IP side (the side having a CCD as a photoelectric conversion device for example provided thereon).

Reference symbol OL designates an image formation optical system, and reference symbol OB designates an original surface (object surface) on which image information to be read is formed. Reference symbol IP designates an image surface on which an image pick-up unit such as a CCD or a photosensitive surface is arranged.

The image formation optical system OL reduction-images the image information-formed on the original surface OB on the image pick-up unit IP by which the image information is in turn read.

Each of the image formation optical system OL in FIGS. 8 to 12 is composed of a telephoto type optical system having six lenses, i.e., a meniscus-shaped first lens L1 having a positive refracting power (hereinafter referred to as "positive") and having a convex surface directed to the original surface OB side, a second lens L2 having a negative refracting power (hereinafter referred to as "negative") and having both lens surfaces in the form of recess surfaces, an aperture stop SP, a positive third lens L3 having both lens surfaces in the form of convex surfaces, a meniscus-shaped negative fourth lens L4 having a recess surface directed to the original surface OB side, a meniscus-shaped fifth lens L5 having a recess surface directed to the original surface OB side, and a meniscus-shaped sixth lens L6 having a recess surface directed to the original surface OB side which are arranged in this order from the original surface OB side.

Figure 10:
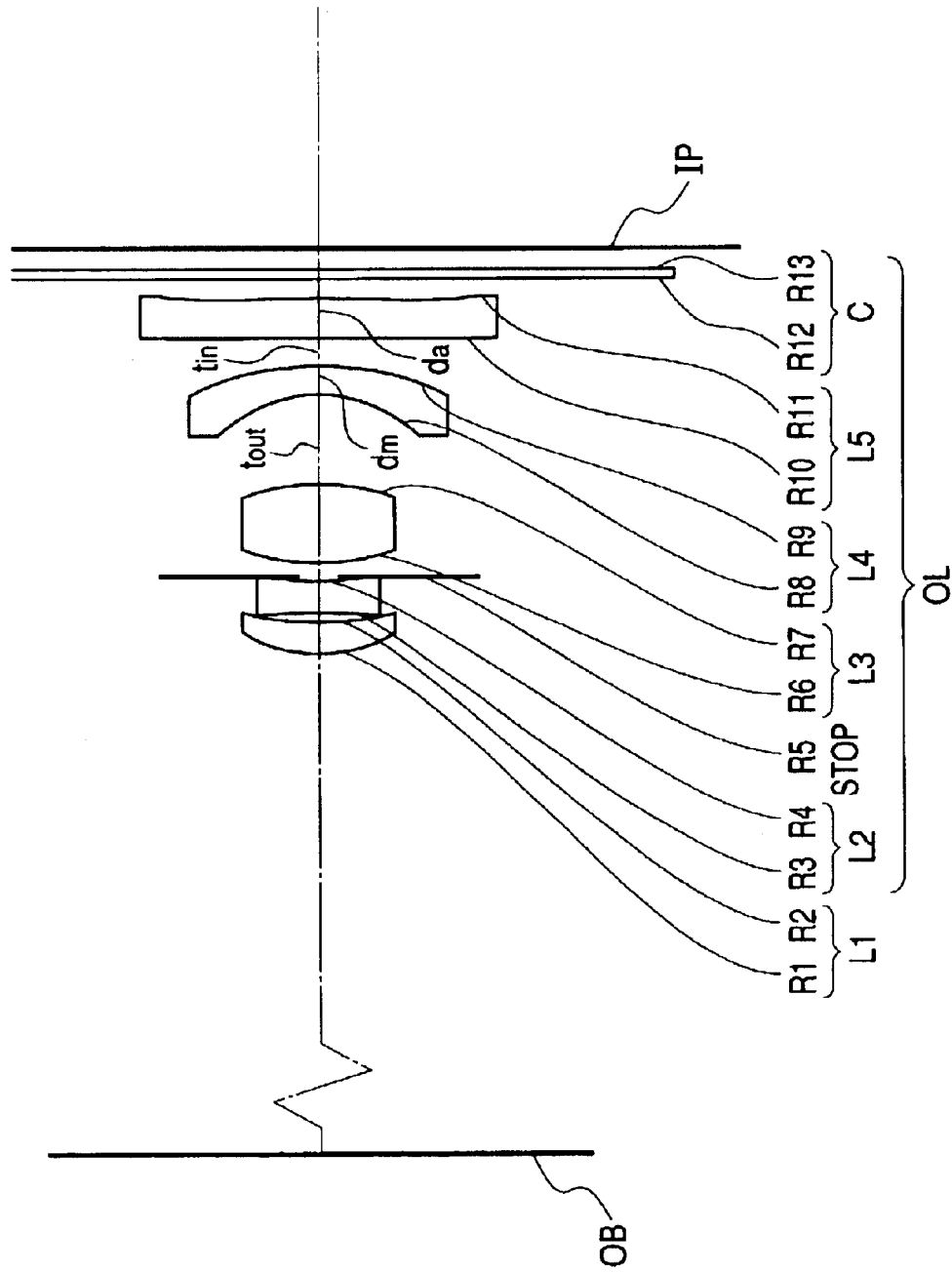
FIG. 10 is a cross sectional view of lenses according to a third numerical embodiment of the present invention.

The image formation optical system OL shown in FIG. 10 is composed of a telephoto type optical system having five lenses, i.e., the meniscus-shaped positive first lens L1 having a convex surface directed to the original surface OB side, the negative second lens L2 having both lens surfaces in the form of recess surfaces, the aperture stop SP, the positive third lens L3 having both lens surfaces in the form of convex surfaces, a meniscus-shaped negative fourth lens L4 having a recess surface directed to the original surface OB side, and a meniscus-shaped fifth lens L5 having a recess surface directed to the original surface OB side which are arranged in this order from the original surface OB side.

The image formation optical system OL of the present invention has, in the lens system, one of anamorphic lens which is rotation asymmetric with respect to the optical axis. Also, the meniscus-shaped meniscus lens having a negative refracting power and having a recess surface directed to the aperture stop SP side is arranged adjacent to the anamorphic lens.

In the present invention, when a thickness of an anamorphic lens is $d_a$, a thickness of a meniscus lens arranged adjacent to the anamorphic lens is $d_m$, an interval between both the lenses is $t_{in}$, and a distance between a lens surface of the lens, of both the lenses, nearest an aperture stop and a lens surface of the lens, other than both the lenses, facing that lens surface is $t_{out}$, the constituent elements are set so as to satisfy the following Expression (1):

$$t_{in} < d_m + d_a < t_{out} \qquad (1)$$

The conditional Expression (1) is satisfied, whereby in the anamorphic lens, it is possible to reduce the angle between a normal in the most outer peripheral portion through which a ray passes and an optical axis, the so-called opening angle.

Thus, even if an anamorphic lens having a small opening angle is used, the correction for the distortion aberration, the coma aberration and the like can be sufficiently carried out to allow the high image formation performance to be maintained.

In addition, in the case where an anamorphic lens is made through the cutting processing using a cutting tool or the like, since an opening angle is small, the frictional force applied to the cutting tool becomes small and hence the processing can be carried out with high accuracy.

Moreover, since the anamorphic lens having a small opening angle is used, in the case as well where the anamorphic lens is made through the glass mold or the plastic molding using a metallic mold, it is also possible to solve a problem in that the processing accuracy of the metallic mold is poor, and hence the die shape can not be accurately transferred to the moldings.

Also, during the measurement of the lens shape as well, it is possible to suppress the frictional force caused between a measuring probe and a lens surface to allow the measurement to be carried out with accuracy.

In addition, in the present invention, the refracting power within the main scanning cross section of the anamorphic surface of the anamorphic lens, and the refracting power within the sub-scanning cross section thereof are changed within the effective range. Then, when the differences between the maximum values of the refractive power and the minimum values of the refractive power are respectively $\Delta\Phi_m$ and $\Delta\Phi_s$, the constituent elements are set so as to meet the following conditional Expressions (2) and (3):

$$0.008 < \Delta\Phi_m < 0.045 \qquad (2)$$

and $$0.000 < \Delta\Phi_s < 0.012 \qquad (3)$$

Moreover, in this embodiment, when a focal length of the main scanning cross section of the image formation optical system is $f_{all}$, a focal length of a meniscus lens arranged adjacent to the anamorphic lens is $f_m$, and a focal length of the main scanning cross section of the anamorphic lens is $f_a$, the constituent elements are set so as to meet the following Expressions (4) and (5):

$$-1.65 < \frac{f_m}{f_{all}} < -1.20 \qquad (4)$$

and $$4.0 < \left|\frac{f_a}{f_m}\right| < 13.5 \qquad (5)$$

The above conditional Expression (1) defines the total thickness of the thickness $d_a$ of the anamorphic lens and the thickness $d_m$ of the meniscus lens so that in particular, an opening angle is suppressed to a small value to maintain the high image formation performance. If the conditional Expression (1) is not met, then a primary factor due to which an opening angle of the anamorphic lens is increased can not be imputed to the adjacent meniscus lens. This is undesirable.

The above conditional Expressions (2) and (3) define the differences $\Delta\Phi_m$ and $\Delta\Phi_s$ between the maximum values and the minimum values, within the effective range, of the refracting powers $\Delta\Phi_m$ and $\Delta\Phi_s$ within the main scanning cross section and the sub-scanning cross section of the anamorphic lens so that in particular, the correction for the curvature of an image surface and the astigmatism is satisfactorily carried out. If the difference $\Delta\Phi_m$ becomes smaller than the lower limit of the conditional Expression (2), then insufficiency in correction is caused so that the image formation performance becomes worse. This is undesirable. If both the upper limits of the conditional Expressions (2) and (3) are exceeded, then the excess in correction is caused so that the higher-order aberration occurs and hence the image formation performance becomes worse. This is also undesirable.

The above conditional Expression (4) is concerned with the ratio of the focal length $f_m$ of the meniscus lens to the focal length $f_{all}$ of the image formation optical system, and the conditional Expression (5) is concerned with the ratio of the focal length $f_a$ of the anamorphic lens to the focal length $f_m$ of the meniscus lens. In particular, these conditional Expressions (4) and (5) are derived so that the correction for the distortion aberration, the curvature of an image surface and the coma aberration, and the correction for the curvature of an image surface and the astigmatism are carried out with good balance. If the conditional Expression (4) is not met, then the shape of the meniscus lens does not have the characteristics suitable for the correction for the distortion aberration and the coma aberration. This is undesirable. Also, if the conditional Expression (5) is not met, the anamorphic lens does not have the characteristics with which the correction for the curvature of an image surface and the astigmatism is suitably carried out. This is undesirable.

In the seventh embodiment, there is adopted the construction in which the two lenses, i.e., the anamorphic lens having a small power and made of plastic and the meniscus lens having a large power and made of glass share the optical performance with which one of conventional anamorphic lens was burdened with each other.

In the seventh embodiment, as expressed in the conditional Expression (4), the partial charge of the power of the meniscus lens is increased to be contributed to the correction for the aberrations such as the curvature of an image surface, and the astigmatism, and as expressed in the conditional Expression (5), the partial charge of the power of the anamorphic lens is reduced to be contributed to the fine adjustment of the curvature of an image surface, the astigmatism and the like.

Since as expressed in the conditional Expression (5), the partial charge of the power of the anamorphic lens is small, even if a plastic mold lens made of a resin which is inexpensive in manufacture cost is used as the anamorphic lens, it is possible to realize the image formation optical system having a smaller change in power due to the fluctuation in environment characteristics (the temperature change and the humidity change).

The maximum opening angle in the ray passing area of the anamorphic lens is preferably equal to or smaller than 40 degrees.

When a focal length of the main scanning cross section of the image formation optical system OL is $f_{all}$, and (maximum outer diameter) of the ray passing area of the anamorphic lens is K, the following conditional Expression is preferably met.

$$0.3 \leq K/f_{all} \leq 1.5$$

More preferably, it is better that the above conditional Expressions (2) to (5) are rewritten as follows.

$$0.010 < \Delta\phi_m < 0.040 \quad (2a)$$

and $$0 < \Delta\phi_s < 0.010 \quad (3a)$$

$$-1.60 < \frac{f_m}{f_{all}} < -1.25 \quad (4a)$$

and $$4.5 < \left|\frac{f_a}{f_m}\right| < 13.0 \quad (5a)$$

In the present invention, one or more of anamorphic lenses may be provided within the image formation optical system OL separately from the anamorphic lens L5.

A form having plural sets of anamorphic lenses and meniscus lenses arranged adjacent thereto which satisfies the conditional Expressions (1) to (5) may also be applied to the present invention.

(First Numerical Embodiment)

Figure 8:
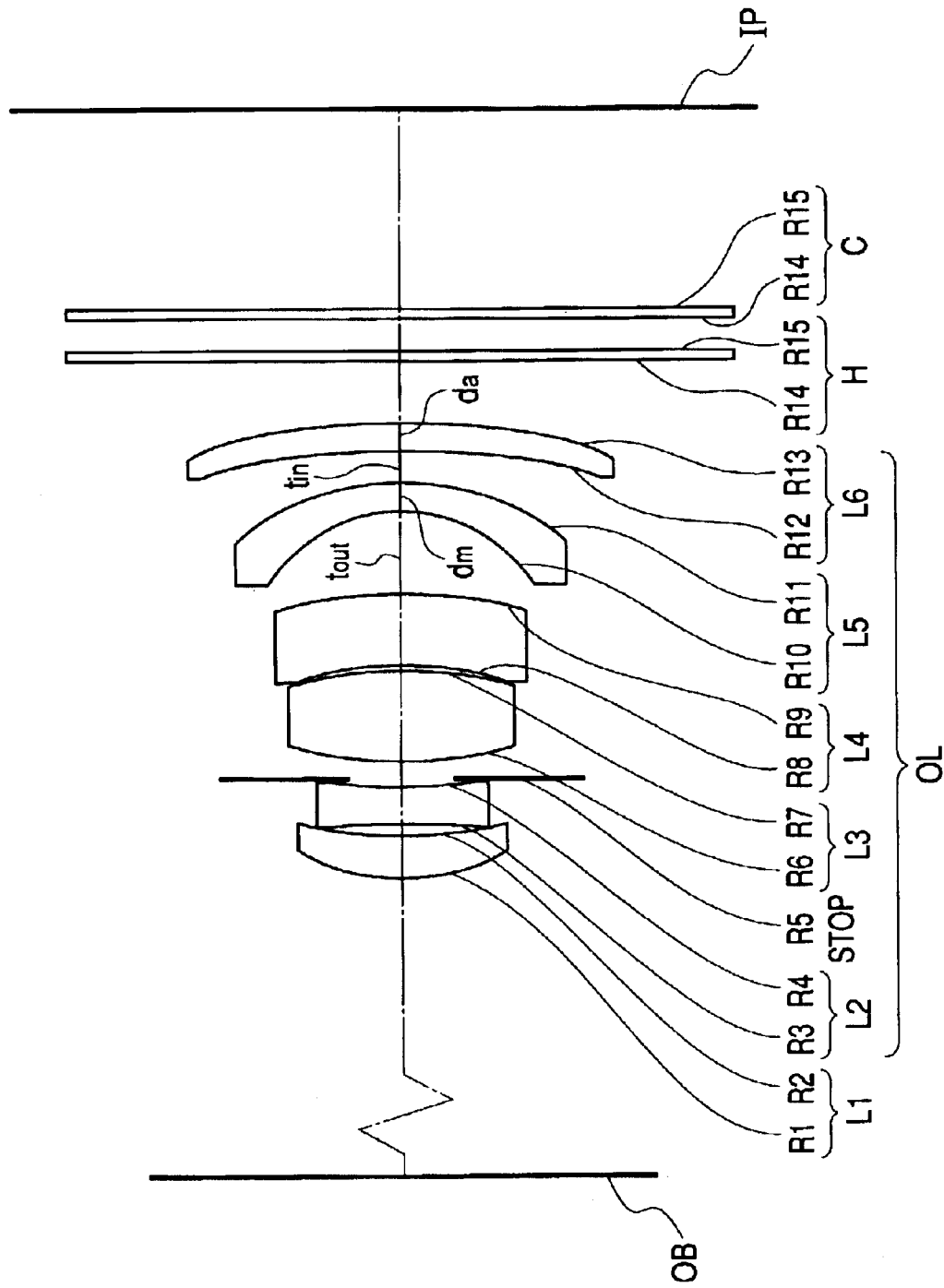
FIG. 8 is a cross sectional view of lenses according to a first numerical embodiment of the present invention.

In a first numerical embodiment shown in FIG. 8, an anamorphic lens made of plastic mold is used as the sixth lens L6. In addition, the meniscus lens L5 made of glass is arranged adjacent to the anamorphic lens L6 so that the correction for the distortion aberration, the coma aberration and the like is satisfactorily carried out.

Figure 13:
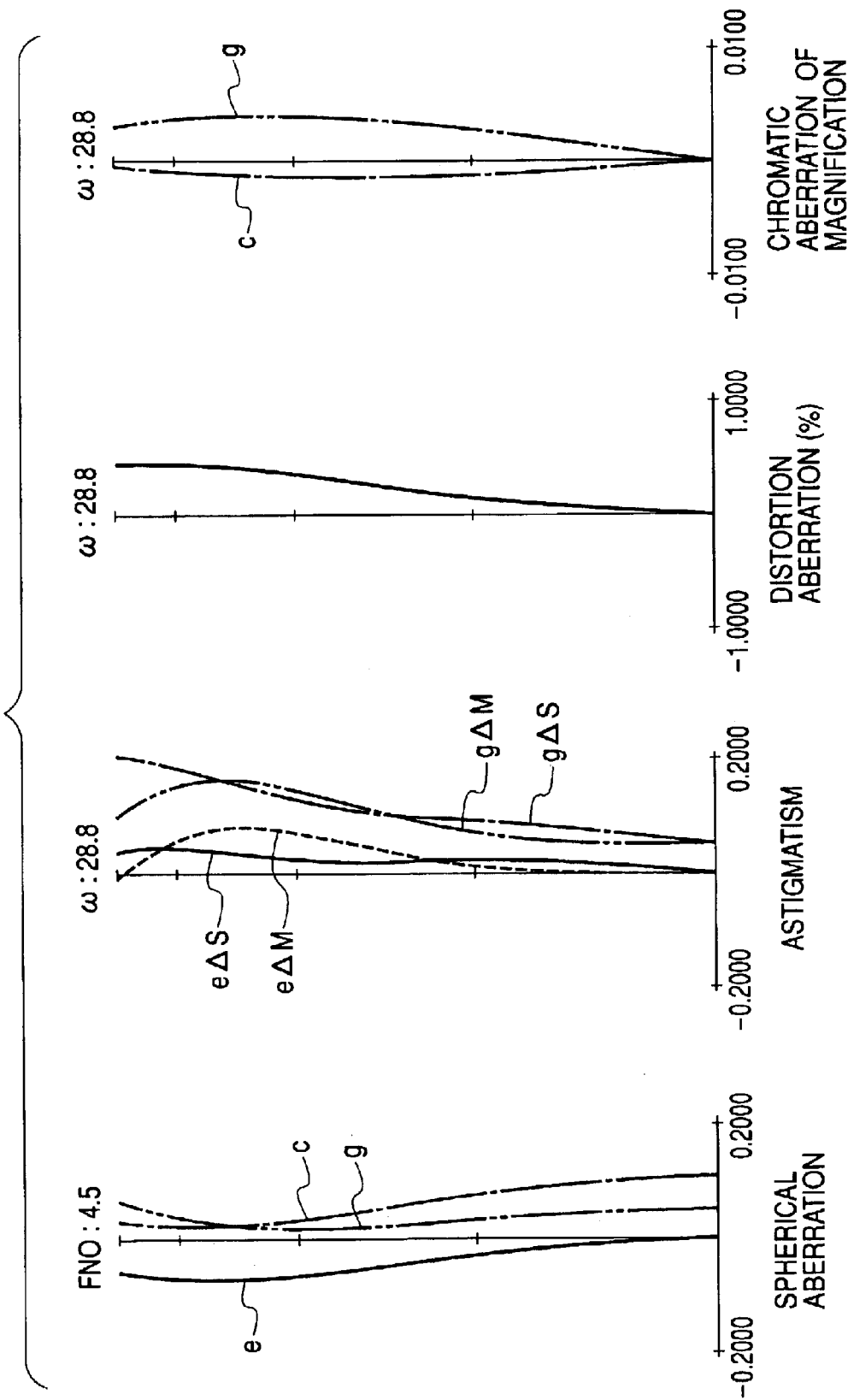
FIG. 13 is a view useful in explaining various aberrations in the first numerical embodiment of the present invention.

For the various aberrations in the first numerical embodiment, as shown in FIG. 13, both a meridional image surface and a sagittal image surface are satisfactorily corrected, and also the astigmatism is also small. Moreover, the various aberrations other than the curvature of an image surface and the astigmatism are also satisfactorily corrected.

In addition, the maximum opening angle of a plane A1 in the ray passing area of the anamorphic lens L6 in the first numerical embodiment is 19.6°, and the maximum opening angle of a plane A2 therein is 22.0°, and thus the lenses can be readily processed.

$K/f_{all}$ is 0.66 in plane A1 and is 0.70 in plane A2.

(Second Numerical Embodiment)

Figure 9:
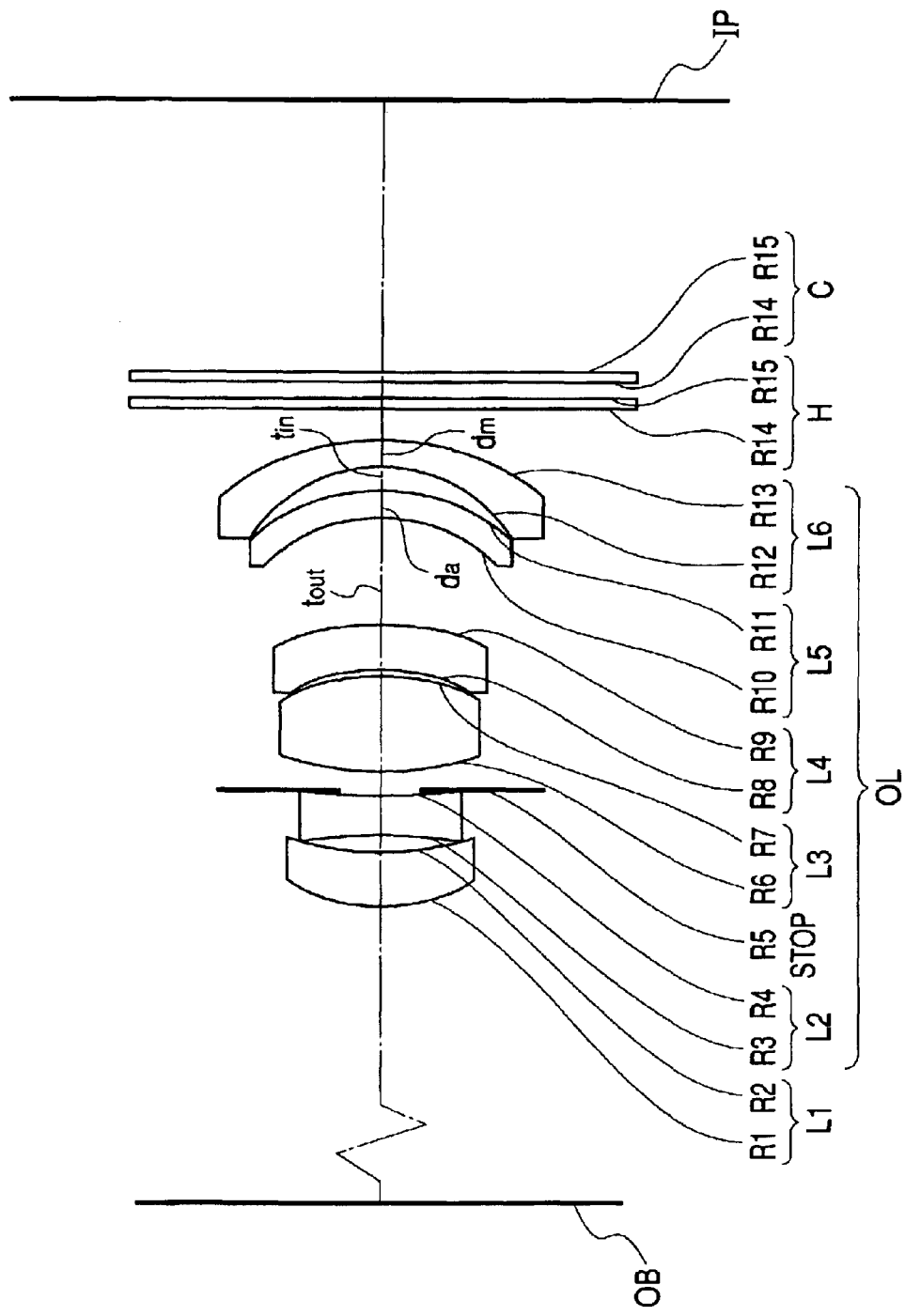
FIG. 9 is a cross sectional view of lenses according to a second numerical embodiment of the present invention.

In a second numerical embodiment shown in FIG. 9, an anamorphic lens made of plastic mold is used as the fifth lens. In addition, the meniscus lens L6 made of glass is arranged adjacent to the anamorphic lens L5 so that the correction for the distortion aberration, the coma aberration and the like is satisfactorily carried out.

Figure 14:
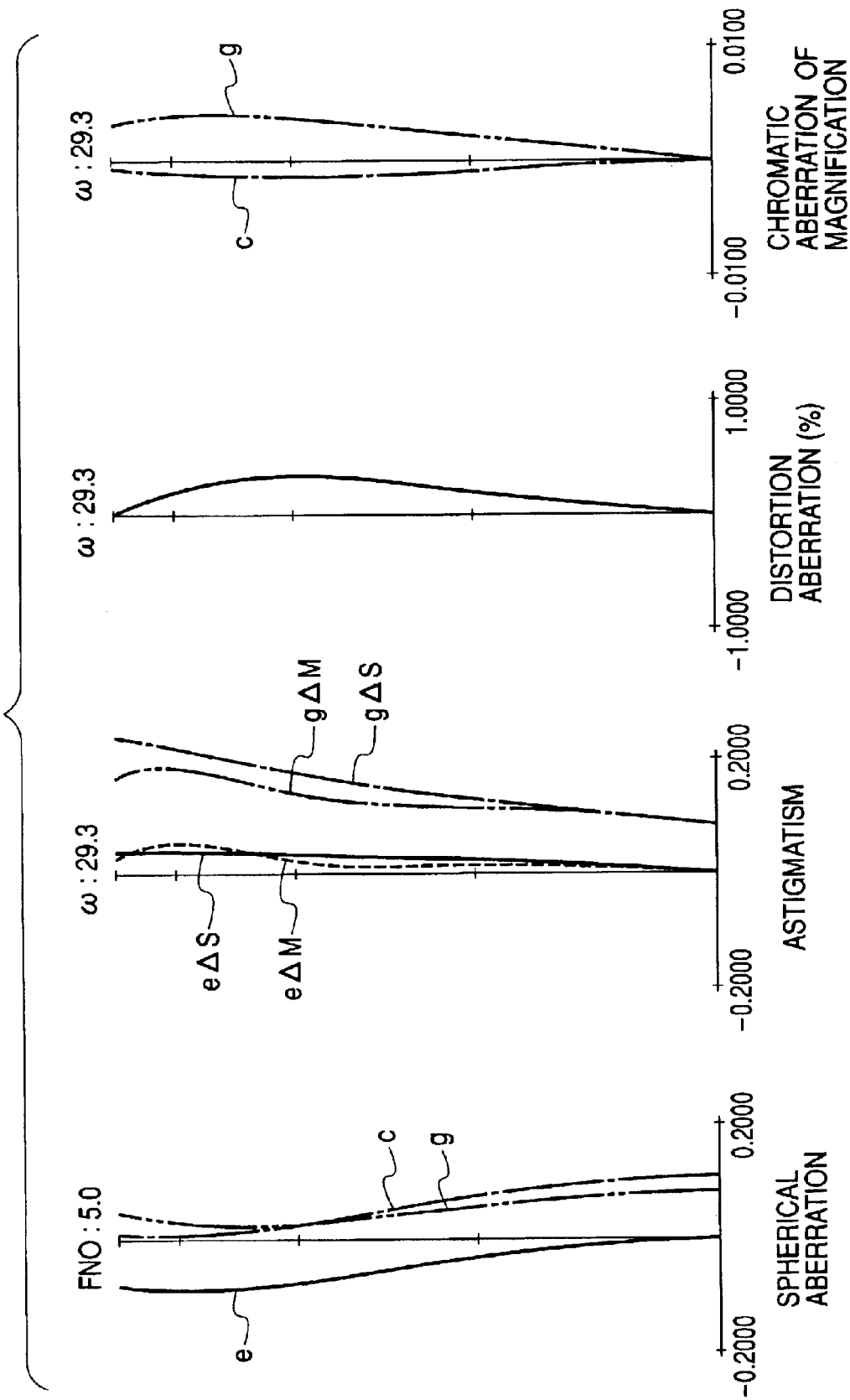
FIG. 14 is a view useful in explaining various aberrations in the second numerical embodiment of the present invention.

For the various aberrations in the second numerical embodiment, as shown in FIG. 14, both the meridional image surface and the sagittal image surface are satisfactorily corrected, and also the astigmatism is also small. Moreover, the various aberrations other than the curvature of an image surface and the astigmatism are also satisfactorily corrected.

In addition, the maximum opening angle of the plane A1 in the ray passing area of the anamorphic lens L5 in the second numerical embodiment is 38.3°, and the maximum opening angle of the plane A2 therein is 35.5°, and thus the lenses can be readily processed as compared with the lens shown in the prior art.

Since the anamorphic lens L5 of the second numerical embodiment is located in the position nearer the aperture stop SP than that in the first numerical embodiment, the anamorphic lens L5 can be made small. In the case where the anamorphic lens L5 is produced by utilizing the molding method using a metallic mold, since a metallic mold is small in size, there is a merit in that the cost can be reduced.

$K/f_{all}$ is 0.44 in plane A1 and is 0.49 in plane A2.

(Third Numerical Embodiment)

In a third numerical embodiment shown in FIG. 10, an anamorphic lens used as the fifth lens L5. In addition, the meniscus lens L4 is arranged adjacent to the anamorphic lens L5 so that the correction for the distortion aberration, the coma aberration and the like is satisfactorily carried out.

Figure 15:
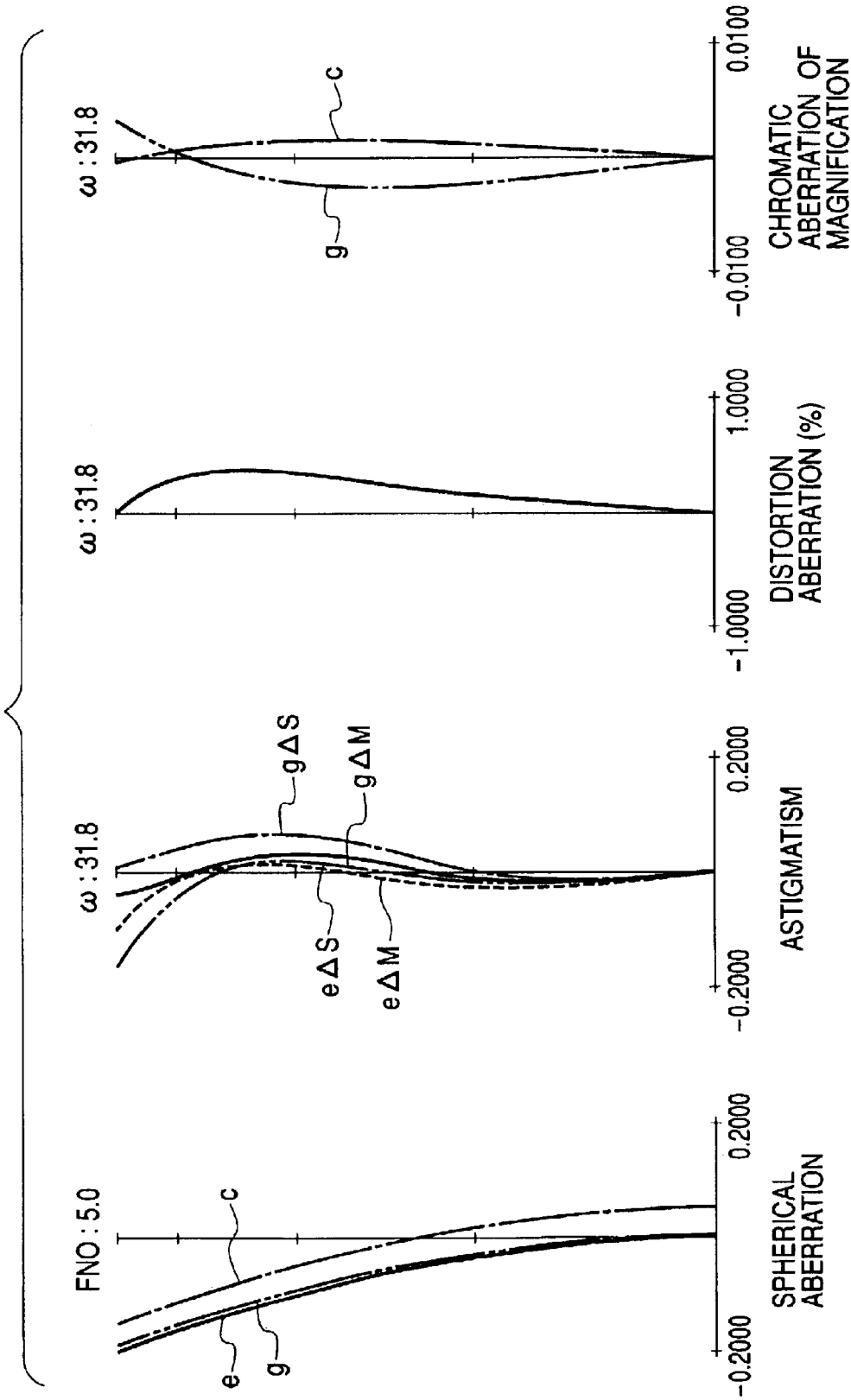
FIG. 15 is a view useful in explaining various aberrations in the third numerical embodiment of the present invention.

For the various aberrations in the third numerical embodiment, though five lenses are provided as shown in FIG. 15, both the meridional image surface and the sagittal image surface are satisfactorily corrected, and the astigmatism is also small. In particular, the correction therefor is satisfactory from the center of the field angle to about 70%. Moreover, the various aberrations other than the curvature of an image surface and the astigmatism are also satisfactorily corrected.

In addition, the maximum opening angle of the plane A1 in the ray passing area of the anamorphic lens L5 in the third numerical embodiment is 1.3°, and the maximum opening angle of the plane A2 therein is 5.5°, and thus the lenses can be very readily processed.

In addition, since the number of lenses in the image formation optical system OL of the third numerical embodiment is fewer than that of each of other numerical embodiments by one, there is a merit in that the cost can be reduced.

$K/f_{all}$ is 1.07 in plane A1 and is 1.13 in plane A2.

(Fourth Numerical Embodiment)

Figure 11:
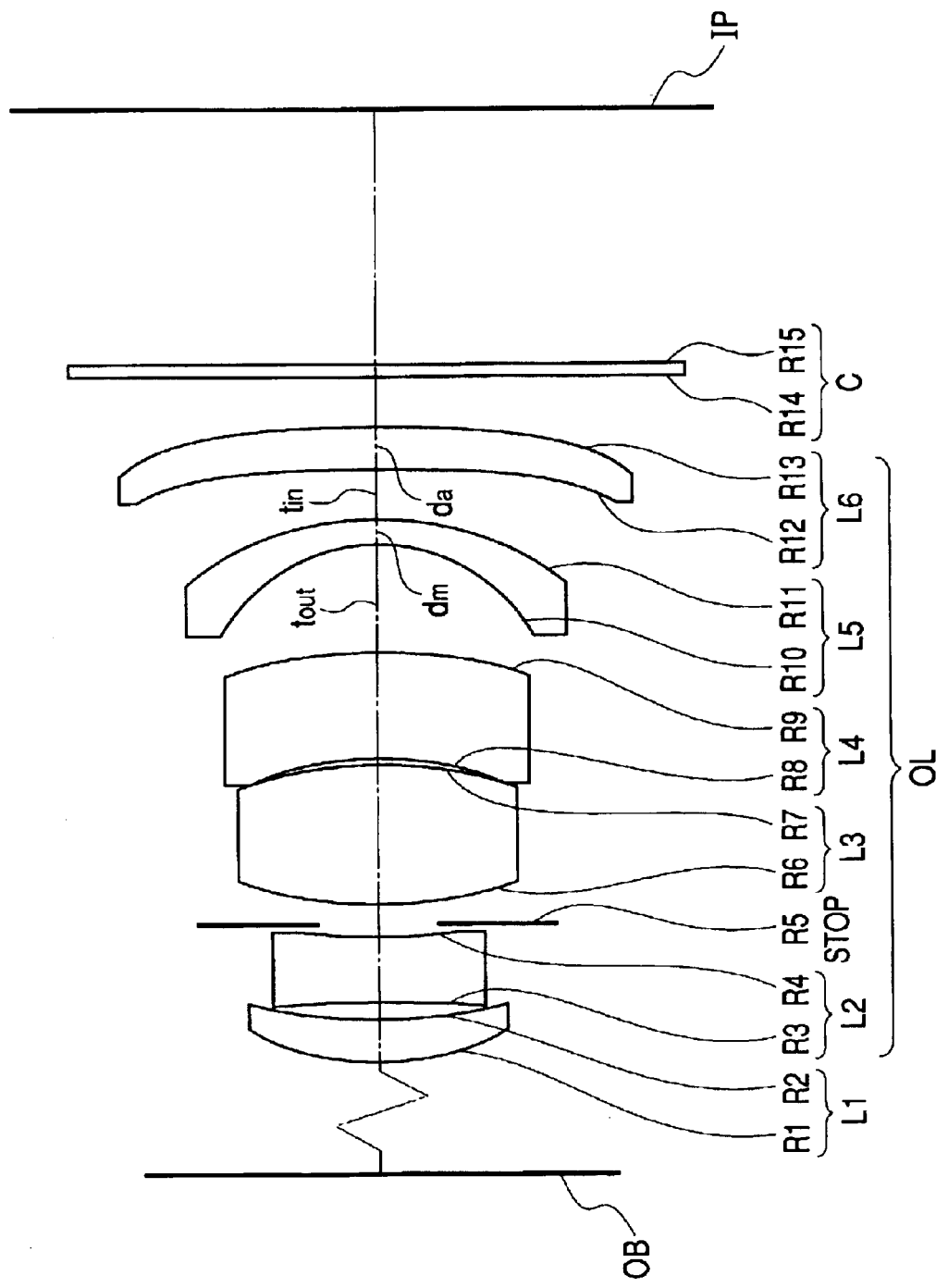
FIG. 11 is a cross sectional view of lenses according to a fourth numerical embodiment of the present invention.

In a fourth numerical embodiment shown in FIG. 11, an anamorphic lens is used as the sixth lens L6. In addition, the meniscus lens L5 is arranged adjacent to the anamorphic lens L6 so that the correction for the distortion aberration, the coma aberration and the like is satisfactorily carried out.

Figure 16:
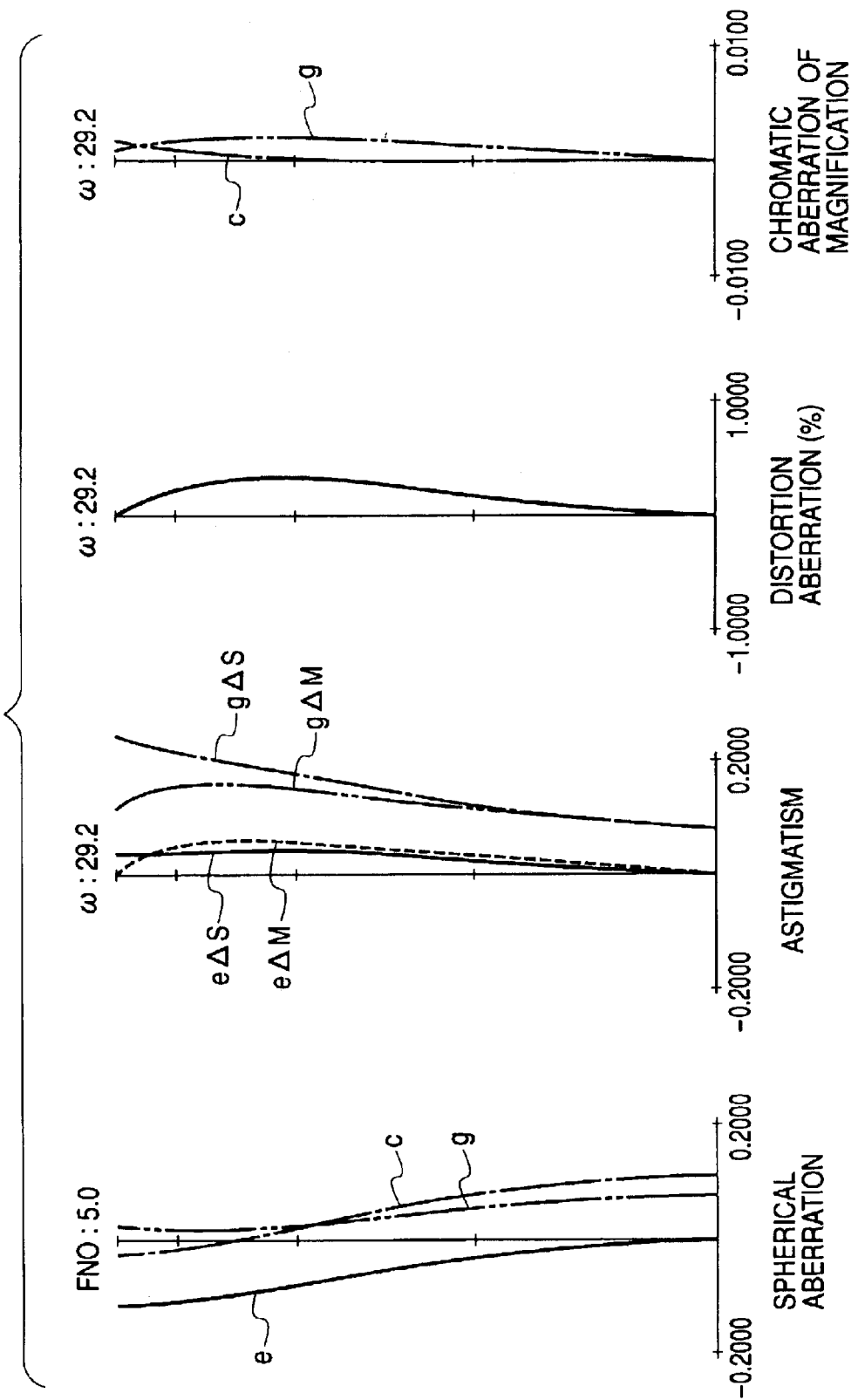
FIG. 16 is a view useful in explaining various aberrations in the fourth numerical embodiment of the present invention.

For the various aberrations of the fourth numerical embodiment, as shown in FIG. 16, both the meridional image surface and the sagittal image surface are satisfactorily corrected, and the astigmatism is also small. Moreover, the various aberrations other than the curvature of an image surface and the astigmatism are also satisfactorily corrected.

In addition, the maximum opening angles in the ray passing area of the anamorphic lens L6 in the fourth numerical embodiment are 22.6° and 25.2°, respectively, and hence the lens can be readily processed.

$K/f_{all}$ is 0.72 in plane A1 and is 0.78 in plane A2.

(Fifth Numerical Embodiment)

Figure 12:
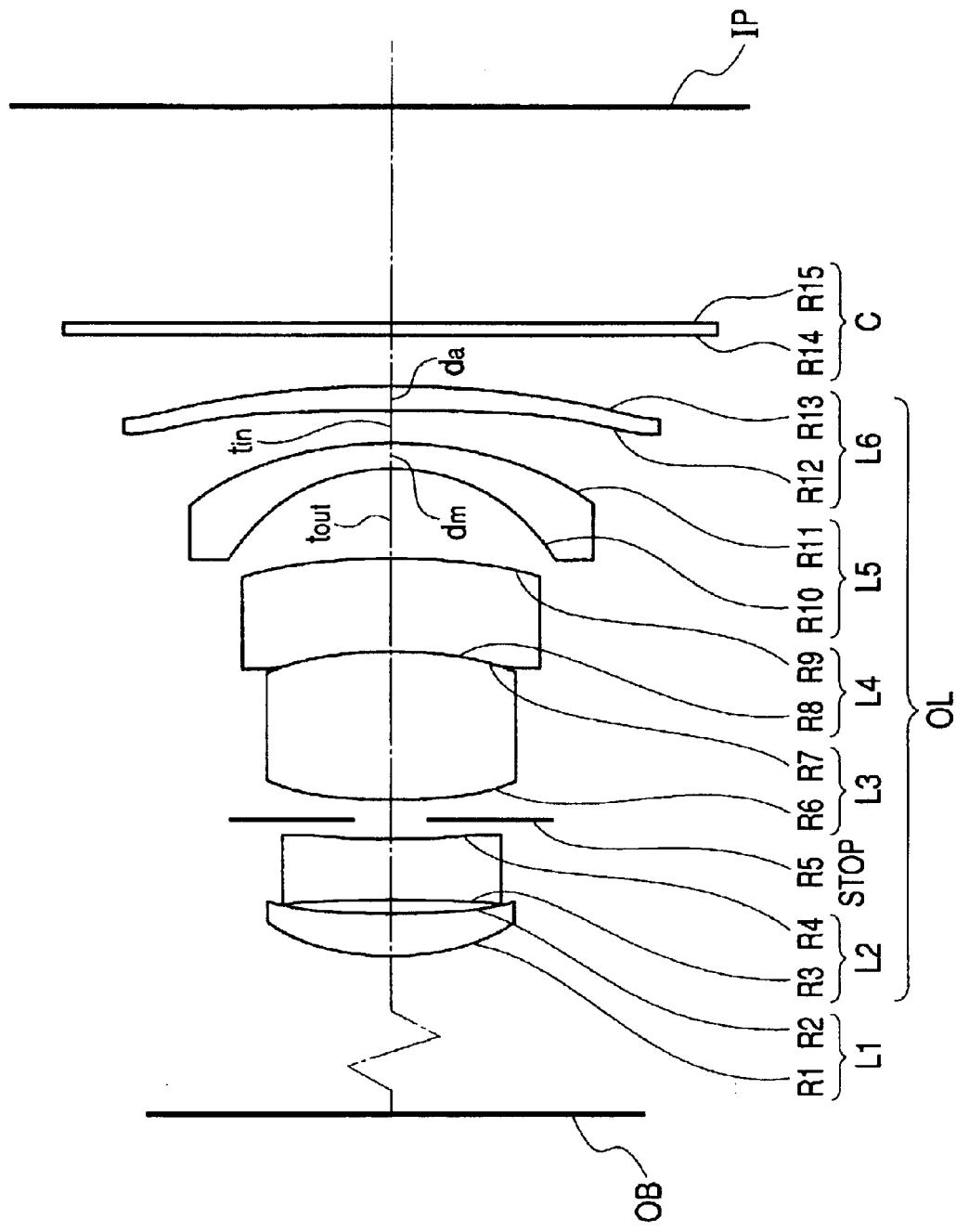
FIG. 12 is a cross sectional view of lenses according to a fifth numerical embodiment of the present invention.

In a fifth numerical embodiment shown in FIG. 12, an anamorphic lens is used as the sixth lens L6. In addition, the meniscus lens L5 is arranged adjacent to the anamorphic lens L6 so that the correction for the distortion aberration, the coma aberration and the like is satisfactorily carried out.

Figure 17:
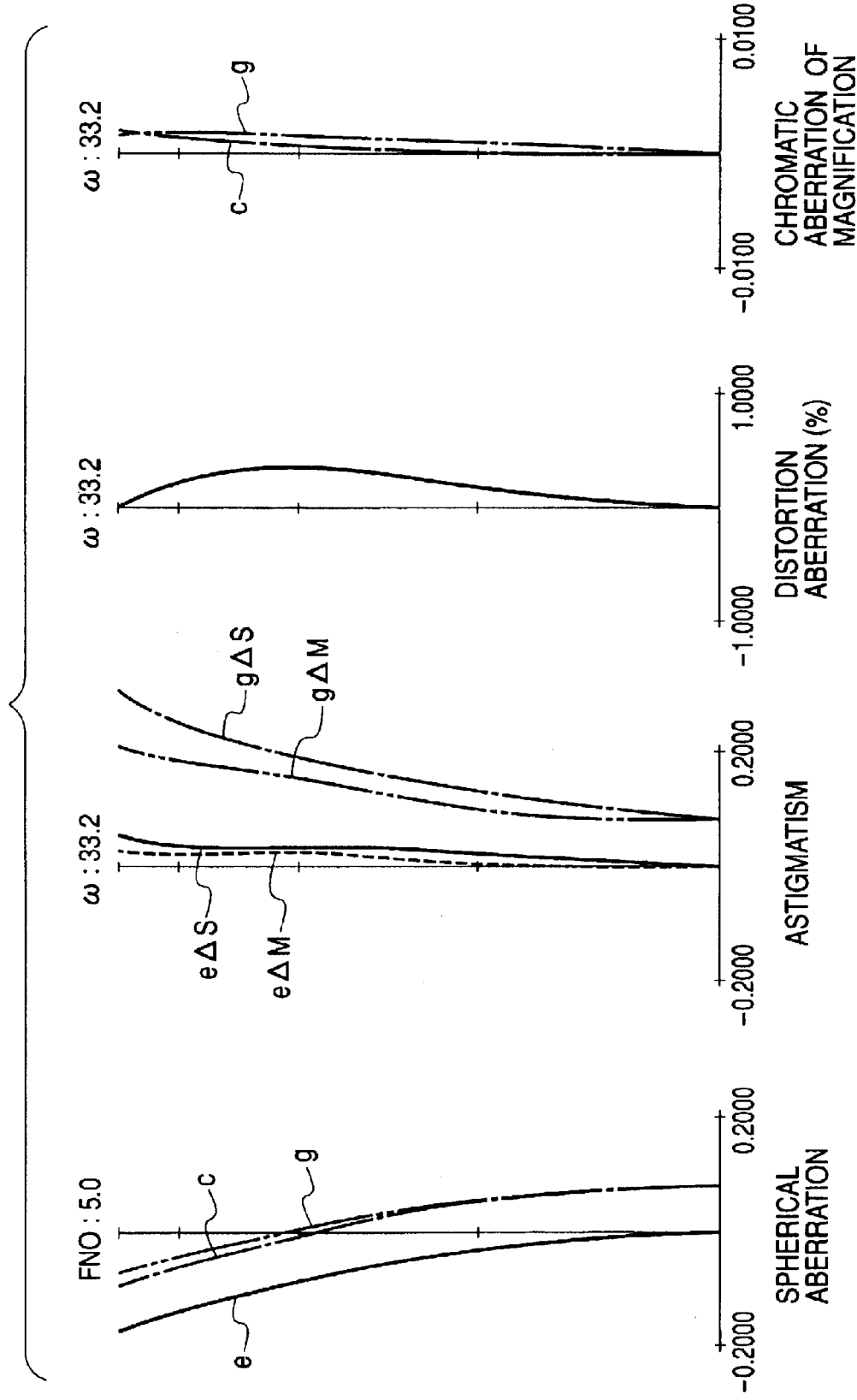
FIG. 17 is a view useful in explaining various aberrations in the fifth numerical embodiment of the present invention.

For the various aberrations of the fifth numerical embodiment, as shown in FIG. 17, both the meridional image surface and the sagittal image surface are satisfactorily corrected, and the astigmatism is also small. Moreover, the various aberrations other than the curvature of an image surface and the astigmatism are also satisfactorily corrected.

While in the fifth numerical embodiment, the half field angle ω reaches no less than 33.2°, since the maximum opening angles in the ray passing area of the anamorphic lens L6 are 12.5° and 14.8°, respectively, and hence the lens can be readily processed.

$K/f_{all}$ is 0.80 in plane A1 and is 0.83 in plane A2.

Since each of the above-mentioned numerical embodiments is designed so that the various numerical values according to the present invention reach the values as those shown in the following Table 1 to satisfy at least one of the conditional Expressions (1) to (5), the object of the present invention is attained.

The anamorphic surface according to the present invention has the surface shape in which a generator shape x and a sagittal shape S are described on the basis of the following Expressions (6), (7) and (8). The sagittal shape is defined as the cross section perpendicular to the meridian.

The meridian shape x and the sagittal shape S are expressed as follows (coordinate system: x represents the direction of an optical axis, y represents the main scanning direction, and z represents the sub-scanning direction):

$$x = \frac{\frac{y^2}{R}}{1 + \sqrt{1 - (1+K)\left(\frac{y}{R}\right)^2}} + B_4 y^4 + B_6 y^6 + B_8 y^8 + B_{10} y^{10} \qquad (6)$$

where R represents a radius of curvature of the meridian on the optical axis, and K, $B_4$, $B_6$, $B_8$ and $B_{10}$ represent the aspherical surface coefficients, respectively.

$$S = \frac{\frac{z^2}{r'}}{1 + \sqrt{1 - (1+k)\left(\frac{z}{r'}\right)^2}} + D_2 z^2 + D_4 z^4 + D_6 z^6 + D_8 z^8 + D_{10} z^{10} \qquad (7)$$

Here, the following Expression (8) is established:

$$r^{-1} = r(1 + E_2 Y^2 + E_4 Y^4 + E_6 Y^6 + E_8 Y^8 + E_{10} Y^{10}) \qquad (8)$$

where r represents a curvature of a cross section of a line of sight of the optical axis, and $D_2$, $D_4$, $D_6$, $D_8$, $D_{10}$, $E_2$, $E_4$, $E_6$, $E_8$ and $E_{10}$ represent the aspherical surface coefficients, respectively.

Next, a numerical embodiment of the present invention will hereinbelow be shown. In the numerical embodiment, Ri is a radius of curvature of an i-th surface from an object side, Di is a thickness of an i-th optical material from the object side and an air interval, and Ni and vi are refractive index and an Abb's number of the i-th optical material from the object side, respectively.

Ri=∞ as a plate represents C as a cover glass of a CCD or H as a protection glass.

First Numerical Embodiment

| fe = 41.1 | FNO = 4.5 | ω = 28.8 | m = −0.255 |
|---|---|---|---|
| R1 = 15.651 | D1 = 3.38 | N1 = 1.697 | v1 = 55.5 |
| R2 = 31.955 | D2 = 0.86 | | |
| R3 = −101.217 | D3 = 3.14 | N2 = 1.689 | v2 = 31.1 |

TABLE 1

| Numeral Embodiment | | 1 | 2 | 3 | 4 | 5 | Conventional |
|---|---|---|---|---|---|---|---|
| Conditional | $t_{in}$ | 2.49 | 1.99 | 2.00 | 3.92 | 2.53 | 7.31 |
| Expression | $d_m + d_a$ | 4.56 | 4.05 | 5.06 | 5.47 | 4.00 | 6.74 |
| (1) | $t_{out}$ | 6.51 | 7.91 | 6.60 | 8.45 | 7.06 | 0.35 |
| (2)  A1 | $\Delta\phi_m$ | 0.021 | 0.013 | 0.039 | 0.026 | 0.011 | 0.009 |
| (3) | $\Delta\phi_s$ | 0.001 | 0.001 | 0.009 | 0.002 | 0.003 | 0.005 |
| A2 | $\Delta\phi_m$ | 0.016 | 0.013 | 0.024 | 0.020 | 0.014 | — |
| | $\Delta\phi_s$ | 0.005 | 0.001 | 0.007 | 0.004 | 0.005 | — |
| (4) (5) | $f_m/f_{all}$ | −1.31 | −1.57 | −1.28 | −1.33 | −1.28 | −5.44 |
| | $|f_a/f_m|$ | 5.93 | 5.27 | 12.77 | 5.81 | 4.83 | 0.18 |

A1 and A2 represent the anamorphic surfaces

|    | fe = 41.1     | FNO = 4.5   | ω = 28.8   | m = −0.255  |
|----|---------------|-------------|------------|-------------|
|    | R4 = 45.191   | D4 = 0.63   |            |             |
|    | R5 = (stop)   | D5 = 1.32   |            |             |
|    | R6 = 32.724   | D6 = 7.11   | N3 = 1.772 | ν3 = 49.6   |
|    | R7 = −32.724  | D7 = 0.50   |            |             |
|    | R8 = −22.157  | D8 = 5.59   | N4 = 1.762 | ν4 = 26.5   |
|    | R9 = −34.314  | D9 = 6.51   |            |             |
|    | R10 = −11.550 | D10 = 2.29  | N5 = 1.603 | ν5 = 38.0   |
|    | R11 = −19.197 | D11 = 2.49  |            |             |
| A1 | R12 = −229.083| D12 = 2.27  | N6 = 1.530 | ν6 = 55.8   |
| A2 | R13 = −97.901 | D13 = 5.00  |            |             |
|    | R14 = ∞       | D14 = 0.80  | N7 = 1.516 | ν7 = 64.1   |
|    | R15 = ∞       | D15 = 2.50  |            |             |
|    | R16 = ∞       | D16 = 0.70  | N8 = 1.516 | ν8 = 64.1   |
|    | R17 = ∞       |             |            |             |

Coefficient of Anamoriphic Surface A1

| R = −229.083   | r = −229.083    |                |
|----------------|-----------------|----------------|
| K = 7.616E+01  | k = −2.445E+03  | E2 = −2.385E−03|
| B4 = −3.253E−05| D4 = −1.685E−04 | E4 = −1.216E−05|
| B6 = 3.432E−08 | D6 = 4.901E−07  | E6 = 4.709E−08 |
| B8 = −3.091E−10| D8 = −4.495E−06 | E8 = 8.145E−10 |
| B10 = 9.957E−13| D10 = −1.614E−08| E10 = −3.131E−12|

Coefficient of Anamorphic Surface A2

| R = −97.901    | r = −97.901     |                |
|----------------|-----------------|----------------|
| K = 2.407E+01  | k = −3.278E+02  | E2 = 5.834E−03 |
| B4 = −1.912E−05| D4 = −2.069E−04 | E4 = 1.187E−04 |
| B6 = 2.048E−08 | D6 = 8.762E−07  | E6 = −1.571E−06|
| B8 = −1.976E−10| D8 = −5.882E−06 | E8 = 9.030E−09 |
| B10 = 6.418E−13| D10 = 1.506E−08 | E10 = −3.228E−12|

Second Numerical Embodiment

|    | fe = 40.2     | FNO = 5.5   | ω = 29.3   | m = −0.255  |
|----|---------------|-------------|------------|-------------|
|    | R1 = 15.675   | D1 = 4.10   | N1 = 1.729 | ν1 = 54.7   |
|    | R2 = 23.932   | D2 = 0.84   |            |             |
|    | R3 = −44.125  | D3 = 3.05   | N2 = 1.689 | ν2 = 31.1   |
|    | R4 = 72.030   | D4 = 0.25   |            |             |
|    | R5 = (stop)   | D5 = 1.41   |            |             |
|    | R6 = 28.018   | D6 = 7.21   | N3 = 1.755 | ν3 = 52.3   |
|    | R7 = −22.126  | D7 = 0.45   |            |             |
|    | R8 = −15.184  | D8 = 3.40   | N4 = 1.762 | ν4 = 26.5   |
|    | R9 = −22.194  | D9 = 7.91   |            |             |
| A1 | R10 = −14.763 | D10 = 2.06  | N5 = 1.603 | ν5 = 38.0   |
| A2 | R11 = −16.766 | D11 = 1.99  |            |             |
|    | R12 = −12.824 | D12 = 1.99  | N6 = 1.530 | ν6 = 55.5   |
|    | R13 = −21.836 | D13 = 2.30  |            |             |
|    | R14 = ∞       | D14 = 0.70  | N7 = 1.516 | ν7 = 64.1   |
|    | R15 = ∞       | D15 = 1.30  |            |             |
|    | R16 = ∞       | D16 = 0.70  | N8 = 1.516 | ν8 = 64.1   |
|    | R17 = ∞       |             |            |             |

Coefficient of Anamorphic Surface A1

| R = −14.763    | r = −14.763     |                |
|----------------|-----------------|----------------|
| K = 1.513E−01  | k = −2.432E+00  | E2 = −3.893E−04|
| B4 = −3.734E−06| D4 = −2.467E−04 | E4 = 7.106E−06 |
| B6 = 1.465E−08 | D6 = 2.605E−06  | E6 = −7.588E−08|
| B8 = −1.182E−09| D8 = −1.811E−05 | E8 = 2.538E−10 |
| B10 = 1.496E−11| D10 = −6.008E−07| E10 = −4.998E−12|

Coefficient of Anamorphic Surface A2

| R = −16.766    | r = −16.766     |                |
|----------------|-----------------|----------------|
| K = −1.099E−01 | k = −1.772E+01  | E2 = 8.403E−04 |
| B4 = −2.358E−06| D4 = −6.191E−04 | E4 = −3.942E−06|
| B6 = −2.757E−08| D6 = 6.919E−06  | E6 = 1.471E−07 |
| B8 = −2.738E−10| D8 = −1.978E−05 | E8 = −2.219E−09|
| B10 = 4.172E−12| D10 = −1.486E−07| E10 = 5.791E−12|

Third Numerical Embodiment

|    | fe = 19.9     | FNO = 5.5   | ω = 31.8   | m = −0.125  |
|----|---------------|-------------|------------|-------------|
|    | R1 = 10.310   | D1 = 2.81   | N1 = 1.755 | ν1 = 52.3   |
|    | R2 = −433.741 | D2 = 0.34   |            |             |
|    | R3 = −24.902  | D3 = 1.99   | N2 = 1.689 | ν2 = 31.1   |
|    | R4 = 10.160   | D4 = 0.44   |            |             |
|    | R5 = (stop)   | D5 = 0.99   |            |             |
|    | R6 = 21.976   | D6 = 5.79   | N3 = 1.788 | ν3 = 47.4   |
|    | R7 = −14.606  | D7 = 6.60   |            |             |
|    | R8 = −9.585   | D8 = 2.06   | N4 = 1.699 | ν4 = 30.1   |
|    | R9 = −22.434  | D9 = 2.00   |            |             |
| A1 | R10 = −116.983| D10 = 3.00  | N5 = 1.530 | ν5 = 55.8   |
| A2 | R11 = −70.394 | D11 = 1.30  |            |             |
|    | R12 = ∞       | D12 = 0.70  | N6 = 1.516 | ν6 = 64.1   |
|    | R13 = ∞       |             |            |             |

Coefficient of Anamorphic Surface A1

| R = −116.983   | r = −116.983    |                |
|----------------|-----------------|----------------|
| K = 9.010E+01  | k = 0.000E+00   | E2 = −1.412E−02|
| B4 = 5.157E−05 | D4 = 0.000E+00  | E4 = 5.530E−06 |
| B6 = 8.533E−08 | D6 = 0.000E+00  | E6 = −4.512E−07|
| B8 = −1.225E−09| D8 = 0.000E+00  | E8 = 2.728E−08 |
| B10 = 0.000E+00| D10 = 0.000E+00 | E10 = 0.000E+00|

Coefficient of Anamorphic Surface A2

| R = −70.394    | r = −70.394     |                |
|----------------|-----------------|----------------|
| K = −5.263E+01 | k = 0.000E+00   | E2 = 5.075E−01 |
| B4 = 5.122E−05 | D4 = 0.000E+00  | E4 = 9.082E−04 |
| B6 = 1.392E−07 | D6 = 0.000E+00  | E6 = −5.345E−05|
| B8 = −1.327E−09| D8 = 0.000E+00  | E8 = 1.201E−07 |
| B10 = 0.000E+00| D10 = 0.000E+00 | E10 = 0.000E+00|

Fourth Numerical Embodiment

|    | fe = 49.3     | FNO = 4.5   | ω = 29.2   | m = −0.220  |
|----|---------------|-------------|------------|-------------|
|    | R1 = 21.655   | D1 = 3.38   | N1 = 1.697 | ν1 = 55.5   |
|    | R2 = 51.121   | D2 = 1.33   |            |             |
|    | R3 = −112.527 | D3 = 5.14   | N2 = 1.689 | ν2 = 31.1   |
|    | R4 = 69.525   | D4 = 0.90   |            |             |
|    | R5 = (stop)   | D5 = 1.67   |            |             |
|    | R6 = 43.550   | D6 = 10.86  | N3 = 1.772 | ν3 = 49.6   |
|    | R7 = −37.653  | D7 = 0.51   |            |             |
|    | R8 = −28.482  | D8 = 8.08   | N4 = 1.762 | ν4 = 26.5   |
|    | R9 = −47.491  | D9 = 8.45   |            |             |
|    | R10 = −15.789 | D10 = 1.98  | N5 = 1.603 | ν5 = 38.0   |
|    | R11 = −27.399 | D11 = 3.92  |            |             |
| A1 | R12 = −460.953| D12 = 3.49  | N6 = 1.530 | ν6 = 55.8   |
| A2 | R13 = −141.260| D13 = 4.00  |            |             |
|    | R14 = ∞       | D14 = 1.00  | N7 = 1.516 | ν7 = 64.1   |
|    | R15 = ∞       |             |            |             |

Coefficient of Anamorphic Surface A1

| | | |
|---|---|---|
| R = −460.953 | r = −460.953 | |
| K = 1.196E+02 | k = −5.702E+02 | E2 = −3.372E−03 |
| B4 = −1.271E+05 | D4 = −7.864E−05 | E4 = 1.252E−06 |
| B6 = 2.204E−09 | D6 = −2.289E−05 | E6 = 1.206E−08 |
| B8 = −3.442E−11 | D8 = 3.340E−07 | E8 = −3.893E−11 |
| B10 = 3.394E−14 | D10 = −2.781E−07 | E10 = 8.515E−14 |

Coefficient of Anamorphic Surface A2

| | | |
|---|---|---|
| R = −141.261 | r = −141.261 | |
| K = 2.349E+01 | k = −1.139E+03 | E2 = 8.283E−03 |
| B4 = −6.294E−06 | D4 = −1.997E−04 | E4 = −1.474E−05 |
| B6 = −3.283E−09 | D6 = 2.425E−06 | E6 = 1.745E−07 |
| B8 = −1.461E−11 | D8 = −8.291E−06 | E8 = 2.575E−09 |
| B10 = 1.365E−14 | D10 = 3.310E−07 | E10 = −5.562E−12 |

Fifth Numerical Embodiment

| | fe = 42.1 | FNO = 6.4 | ω = 33.2 | m = −0.220 |
|---|---|---|---|---|
| | R1 = 20.695 | D1 = 3.25 | N1 = 1.697 | ν1 = 55.5 |
| | R2 = 56.701 | D2 = 1.08 | | |
| | R3 = −100.210 | D3 = 4.75 | N2 = 1.689 | ν2 = 31.1 |
| | R4 = 57.374 | D4 = 1.65 | | |
| | R5 = (stop) | D5 = 1.49 | | |
| | R6 = 37.151 | D6 = 11.34 | N3 = 1.772 | ν3 = 49.6 |
| | R7 = −31.297 | D7 = 0.20 | | |
| | R8 = −28.245 | D8 = 7.13 | N4 = 1.762 | ν4 = 26.5 |
| | R9 = −51.668 | D9 = 7.06 | | |
| | R10 = −14.784 | D10 = 2.00 | N5 = 1.603 | ν5 = 38.0 |
| | R11 = −28.408 | D11 = 2.53 | | |
| A1 | R12 = −403.261 | D12 = 2.00 | N6 = 1.530 | ν6 = 55.8 |
| A2 | R13 = −103.065 | D13 = 4.00 | | |
| | R14 = ∞ | D14 = 1.00 | N7 = 1.516 | ν7 = 64.1 |
| | R15 = ∞ | | | |

Coefficient of Anamorphic Surface A1

| | | |
|---|---|---|
| R = −403.261 | r = −403.261 | |
| K = 1.444E+02 | k = −3.260E+03 | E2 = −3.779E−03 |
| B4 = −1.355E−05 | D4 = −6.393E−04 | E4 = 1.007E−06 |
| B6 = 3.538E−09 | D6 = −7.873E−04 | E6 = 1.623E−08 |
| B8 = −2.282E−11 | D8 = 3.526E−04 | E8 = −2.343E−11 |
| B10 = 1.157E−13 | D10 = 4.903E−05 | E10 = 3.050E−14 |

Coefficient of Anamorphic Surface A2

| | | |
|---|---|---|
| R = −103.065 | r = −103.065 | |
| K = 1.644E+01 | k = −1.231E+03 | E2 = 1.349E−02 |
| B4 = −4.187E−06 | D4 = −1.315E−03 | E4 = −9.728E−05 |
| B6 = −3.456E−09 | D6 = 2.242E−04 | E6 = 7.482E−07 |
| B8 = −1.434E−11 | D8 = −3.861E−04 | E8 = 1.759E−09 |
| B10 = 1.036E−13 | D10 = 2.798E−04 | E10 = 1.588E−11 |

Conventional Example

| | fe = 30.6 | FNO = 5.0 | ω = 30.0 | m = −0.189 |
|---|---|---|---|---|
| | R1 = 16.201 | D1 = 1.87 | N1 = 1.772 | ν1 = 49.6 |
| | R2 = 35.993 | D2 = 1.26 | | |

-continued

| | fe = 30.6 | FNO = 5.0 | ω = 30.0 | m = −0.189 |
|---|---|---|---|---|
| | R3 = −46.836 | D3 = 2.30 | N2 = 1.640 | ν2 = 34.5 |
| | R4 = 22.827 | D4 = 3.14 | | |
| | R5 = (stop) | D5 = 0.00 | | |
| | R6 = 18.418 | D6 = 6.27 | N3 = 1.772 | ν3 = 49.6 |
| | R7 = −19.587 | D7 = 0.35 | | |
| | R8 = −13.708 | D8 = 5.74 | N4 = 1.847 | ν4 = 23.8 |
| | R9 = −18.096 | D9 = 7.31 | | |
| A1 | R10 = −11.562 | D10 = 1.00 | N5 = 1.699 | ν5 = 30.1 |
| | R11 = −26.668 | | | |

Coefficient of Anamorphic Surface A1

| | | |
|---|---|---|
| R = −11.562 | r = −11.562 | |
| K = 3.680E−01 | k = 0.000E+00 | E2 = −2.630E−03 |
| B4 = −4.154E−06 | D4 = 0.000E+00 | E4 = 2.820E−05 |
| B6 = 5.351E−08 | D6 = 0.000E+00 | E6 = −2.267E−07 |
| B8 = 0.000E+00 | D8 = 0.000E+00 | E8 = 0.000E+00 |
| B10 = 0.000E+00 | D10 = 0.000E+00 | E10 = 0.000E+00 |

All the image formation optical systems of the first to seventh embodiments are constituted by the lenses. However, the present invention is not limited thereto.

In the present invention, in each of the first to seventh embodiments, in addition to the lenses, a diffraction optical element or a power mirror may be arranged within the image formation optical system. For example, a lens having a diffraction grating provided on its lens surface may be provided within the image formation optical system.

[Flat-Bed Type Image Reading Apparatus]

Figure 18:
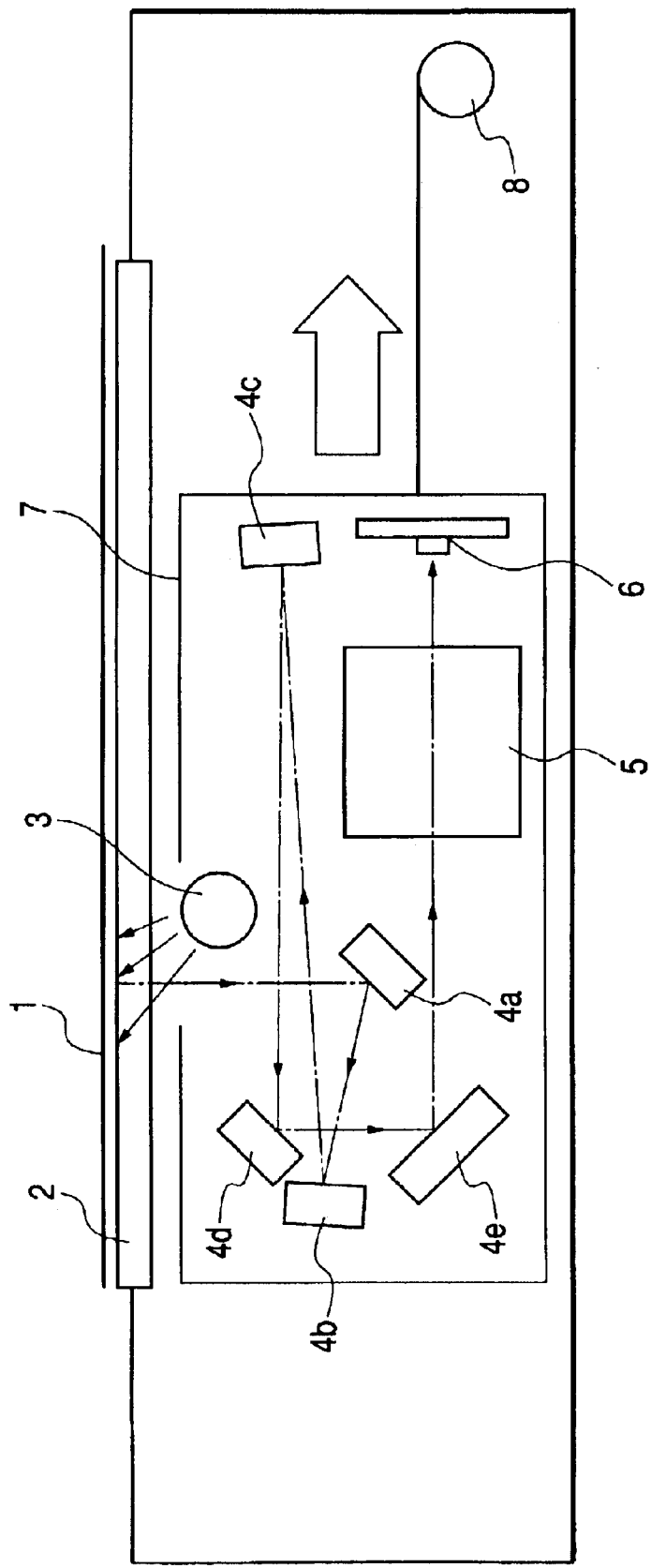
FIG. 18 is a schematic view showing construction of a main portion when the image formation optical system of the present invention is applied to an image reading apparatus of a digital color copying machine.

FIG. 18 is a schematic view showing construction of a main portion when the image formation optical system in any one of the first to third embodiments, and the first to fifth numerical embodiments of the present invention is applied to a carriage integral type (flat-bed type) image reading apparatus such as a digital copying machine. In the figure, the same constituent elements as those shown in FIG. 4 are designated with the same reference numerals.

In this embodiment, a luminous flux radiated from the illumination system 3 is applied to the original 1 directly or indirectly through a reflector (not shown). The optical path of the luminous flux of the reflected light from the original 1 is optically folded inside the carriage 7 through the first reflecting mirror 4a, the second reflecting mirror 4b, the third reflecting mirror 4c, the fourth reflecting mirror 4d and the fifth reflecting mirror 4e to be imaged on the surface of the CCD 6 as a reading unit by the image formation optical system 5 (OL) in any one of the above-mentioned first to third embodiments, and the first to fifth numerical embodiments.

Then, the carriage 7 is moved in a direction indicated by an arrow (sub-scanning direction) by a sub-scanning motor to thereby read the image information of the original 1. Then, the image information thus read is sent to a personal computer or the like as an external apparatus through an interface (not shown).

Note that the present invention is not limited to the integral type (flat-bed type) image reading apparatus. For example, even if the image formation optical system of the present invention is applied to an image reading apparatus having a 1:2 scanning optical system shown in FIG. 19, the present invention can be applied thereto similarly to the case of the above-mentioned embodiments.

Figure 19:
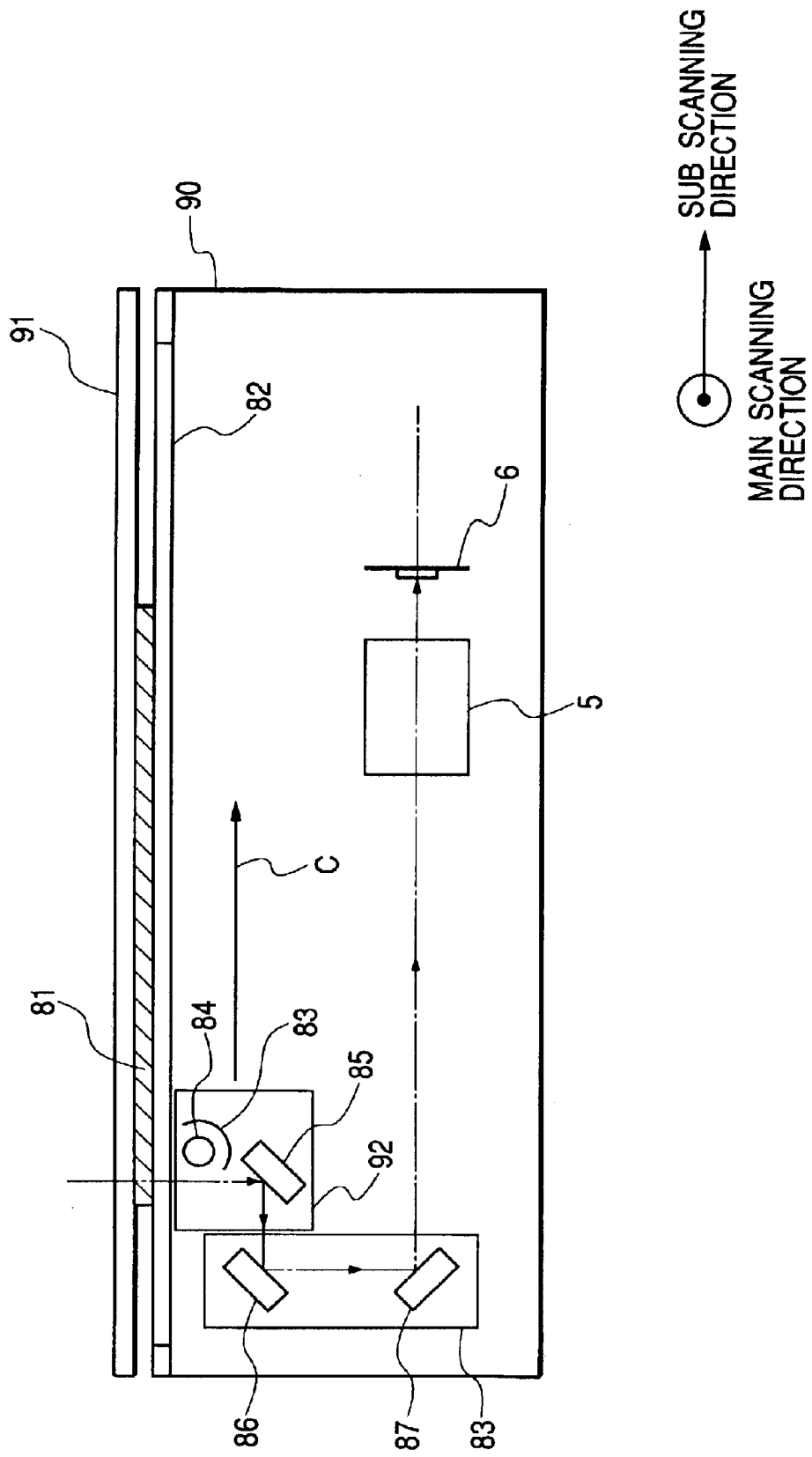
FIG. 19 is a schematic view showing construction of a main portion when the image formation optical system of the present invention is applied to the image reading apparatus of the digital color copying machine.
Figure 20:
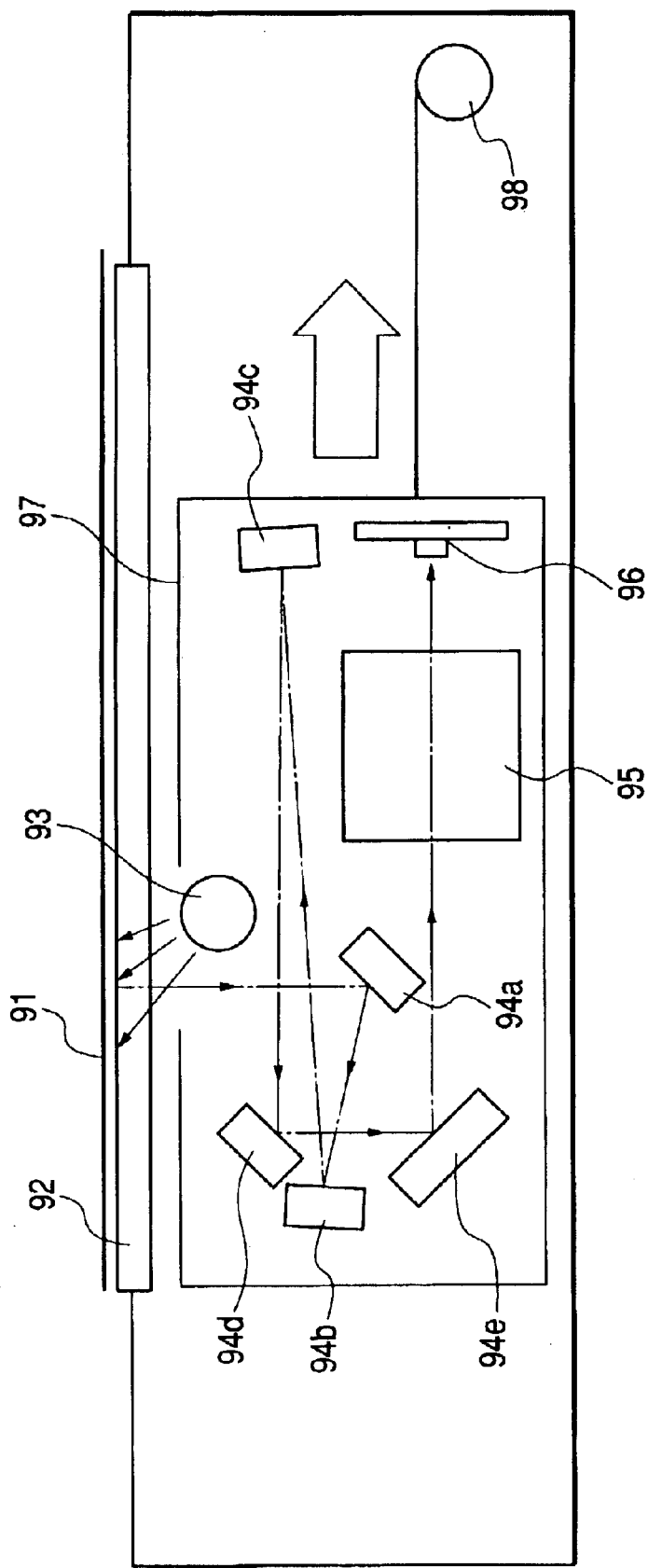
FIG. 20 is a schematic view showing construction of a main portion of a conventional image reading apparatus.
Figure 21:
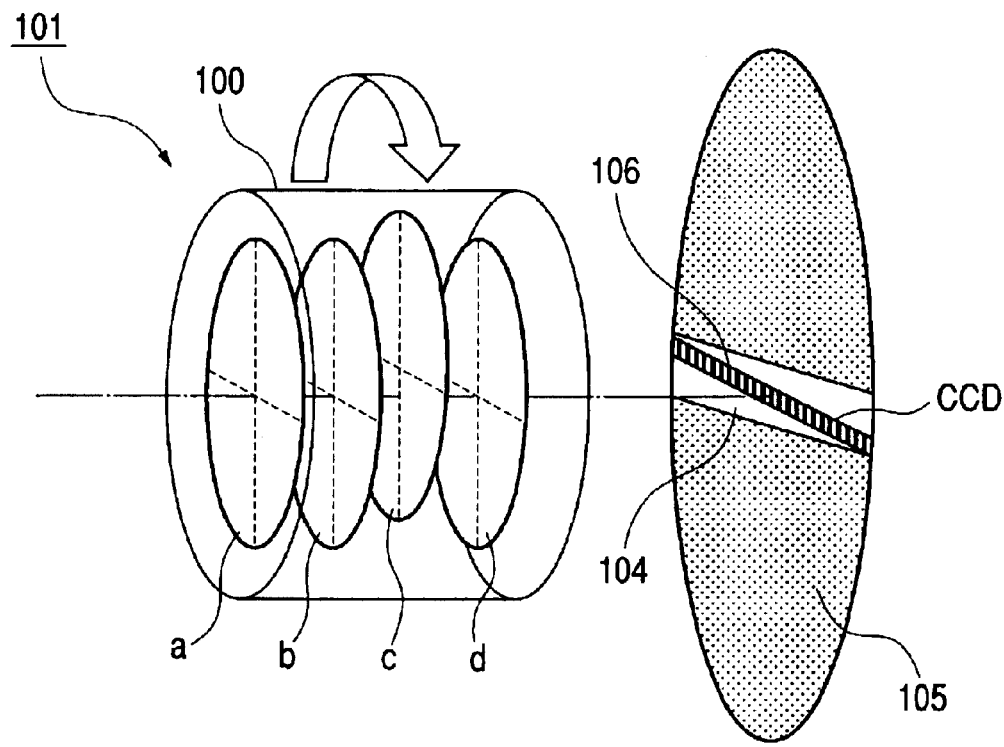
FIG. 21 is a schematic view showing construction of a main portion of a conventional image formation optical system using only rotation symmetric lenses.
Figure 22:
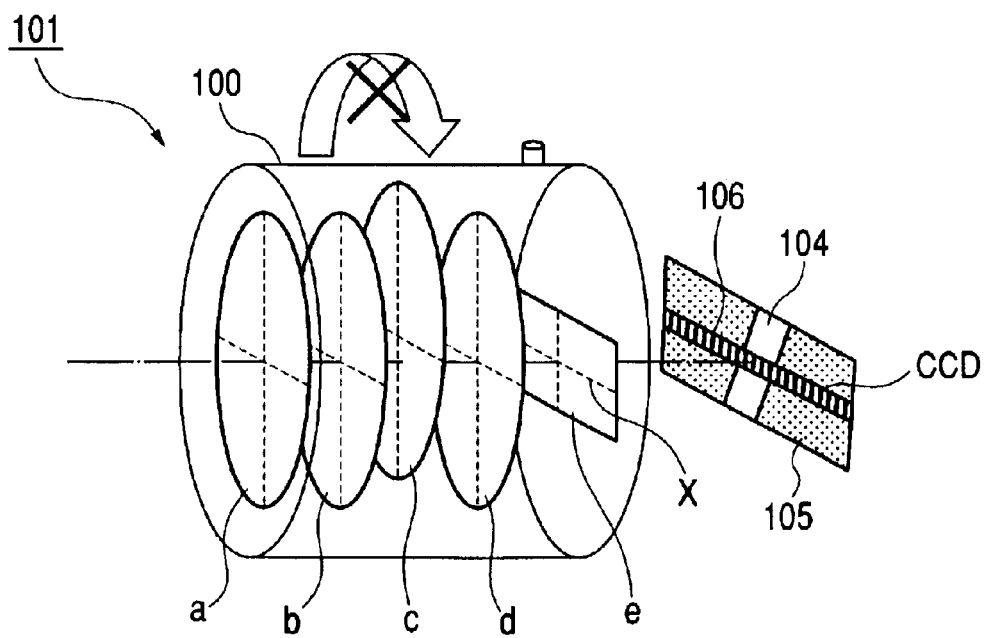
FIG. 22 is a schematic view showing construction of a main portion of the conventional image formation optical system using a rotation asymmetric lens.
Figure 23:
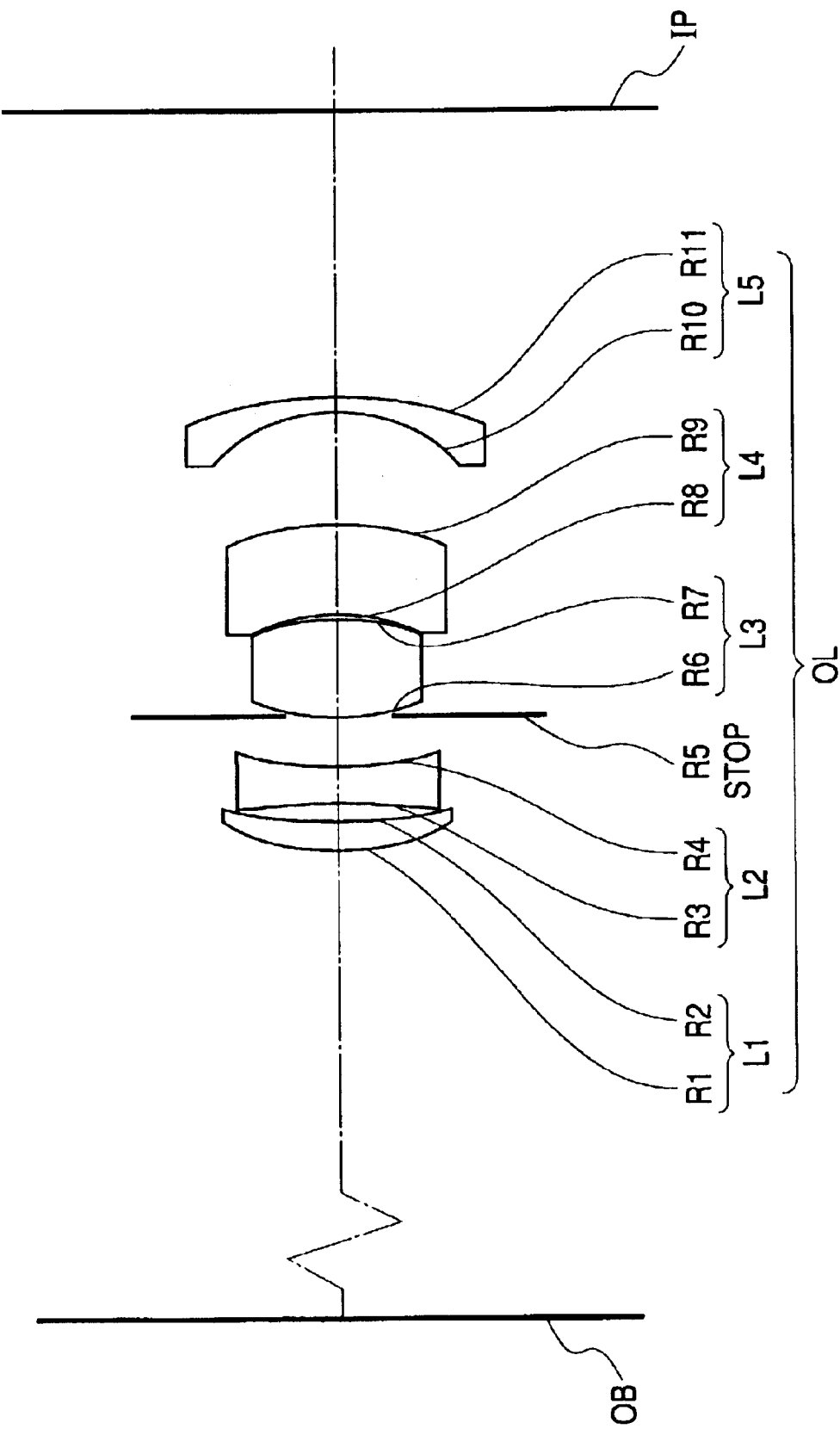
FIG. 23 is a cross sectional view showing construction of the conventional image formation optical system using an anamorphic lens.
Figure 24:
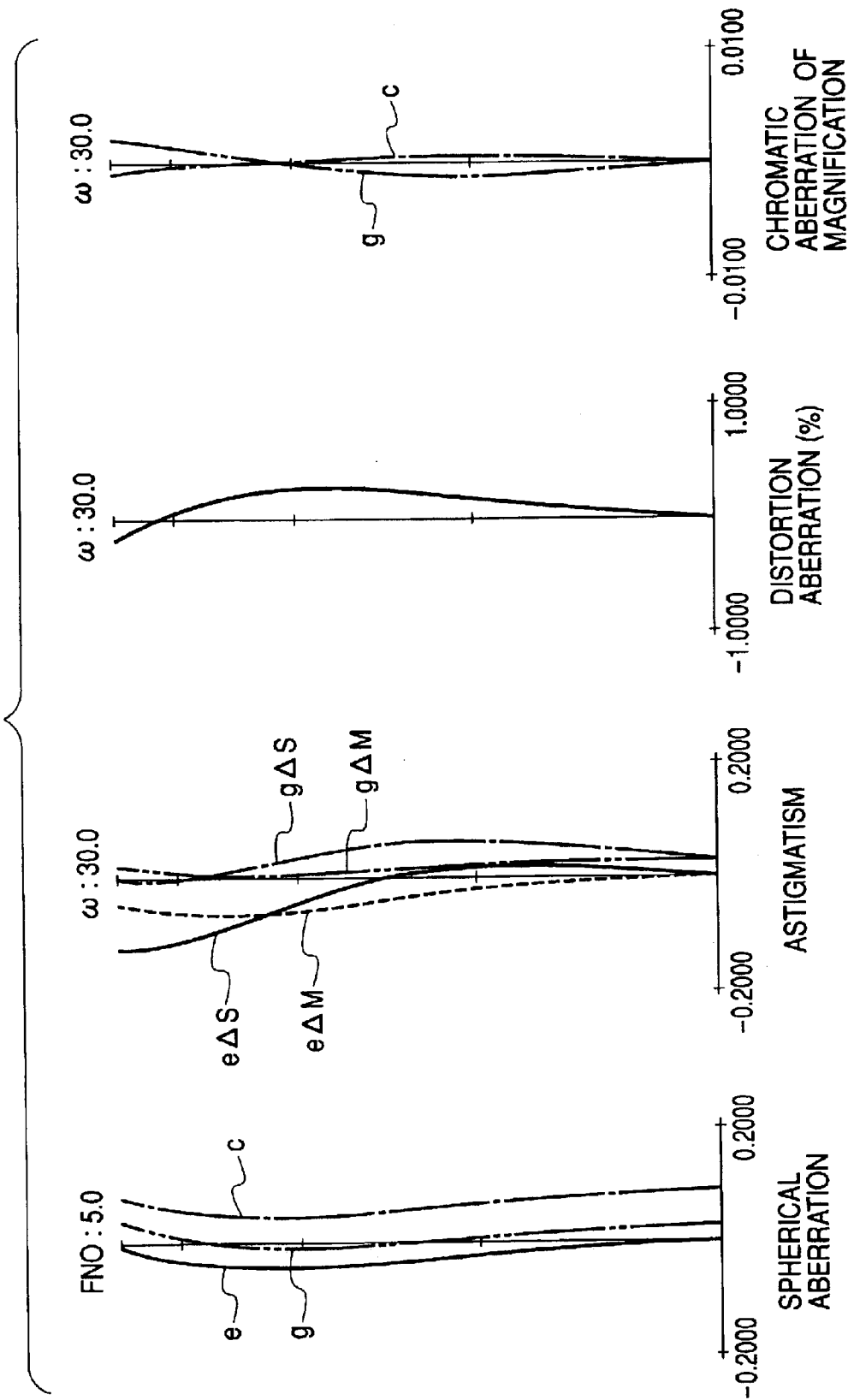
FIG. 24 is a view useful in explaining various aberrations in the conventional image formation optical system using the anamorphic lens.

That is, in FIG. 19, reference numeral 82 designates an original table glass on the surface of which an original 81 is placed. Reference numeral 84 designates an illumination light source which is composed of a halogen lamp, a fluorescent lamp, a xenon lamp or the like, for example. Reference numeral 83 designates a reflector by which a luminous flux from the illumination light source 84 is reflected to efficiently illuminate the original 81. Reference numerals 85, 86 and 87 designate first reflecting mirror, second reflecting mirror and third reflecting mirror, respectively, by which the optical path of the luminous flux from the original 81 is optically folded inside the main body. Reference numeral 5 designates the image formation optical system in any one of first to sixth embodiments, and the first to fifth numerical embodiments which serves to image the luminous flux obtained from the image information of the original 81 on the surface of the photoelectric conversion device 6. Reference numeral 6 designates a line sensor (CCD) as a photoelectric conversion device. Reference numeral 90 designates a main body, reference numeral 91 designates a platen, reference numeral 92 designates a first mirror stage, and reference numeral 93 designates a second mirror stage.

In the figure, a luminous flux radiated from the illumination light source 84 is applied to the original 81 directly or indirectly through the reflector 83. The optical path of the luminous flux of the reflected light from the original 81 is optically folded inside the main body through the first reflecting mirror 85, the second reflecting mirror 86 and the third reflecting mirrors 87 to be imaged on the surface of the CCD 6 by the image formation optical system 5. At this time, the first reflecting mirror 85, the second reflecting mirror 86 and the third reflecting mirror 87 electrically scan the original 81 in the main scanning direction while being moved in the sub-scanning direction to thereby read the image information of the original 81. At this time, the second reflecting mirror 86 and the third reflecting mirror 87 are moved by half a quantity of movement of the first reflecting mirror 85 to hold fixed the distance between the original 81 and the CCD 6.

Note that, while in this embodiment, the image formation optical system of the present invention is applied to the image reading apparatus of the digital color copying machine, the present invention is not limited thereto. For example, the image formation optical system of the present invention may also be applied to the various color image reading apparatuses such as a color image scanner.

As set forth hereinabove, according to the present invention, in an image formation optical system having at least one sheet of rotation asymmetric lens, constituent elements are constructed so as to carry out the rotation adjustment, whereby it is possible to obtain an image formation optical system which is excellent in mass production due to the reduction in processing cost and the improvement in yield as compared with a conventional image formation optical system using a rotation asymmetric lens, and an image reading apparatus using the same.

In addition, as set forth hereinabove, according to the present invention, in an image formation optical system having at least one sheet of rotation asymmetric lens having a rotation asymmetric shape, a second alignment reference surface provided in a rotation asymmetric lens is brought into contact with a first alignment reference surface provided in a barrel supporting portion to align certain one direction of the refracting power of the rotation asymmetric lens with the direction of arrangement of a plurality of light receiving elements, whereby it is possible to reduce a primary factor of the error occurring when one direction of the refracting power of the rotation asymmetric lens is aligned with the direction of arrangement of the reading portions, and thus it is possible to obtain an image reading apparatus which is capable of sufficiently exhibiting the optical performance of the image formation optical system to read image information with high accuracy.

Moreover, as set forth hereinabove, according to the present invention, a meniscus lens is arranged adjacent to an anamorphic lens, and constituent elements are set so as to satisfy the conditional Expressions, whereby it is possible to obtain an image formation optical system which is excellent in image formation performance while reducing an opening angle of the anamorphic lens, and an image reading apparatus using the same.

While the present invention has been particularly shown and described with reference to the preferred embodiments and the numerical embodiments, it will be understood that the various changes and modifications will occur to those skilled in the art without departing from the scope and true spirit of the invention. The scope of the invention is, therefore, to be determined solely by the appended claims.

What is claimed is:

1. An image formation optical system for imaging image information of an original on a photoelectric conversion device having a plurality of pixels arranged in a one-dimensional direction, comprising:
   a lens barrel holding at least one rotation symmetric lens having a shape which is rotation symmetric with respect to an optical axis; and
   a lens barrel holding a rotation asymmetric lens having a rotation asymmetric shape, the lens barrels being assembled so as to be mutually rotatable for adjustment, and
   wherein one direction of a refracting power of the rotation asymmetric lens of the image formation optical system is aligned with the direction of arrangement of the plurality of pixels of the photoelectric conversion device.

2. An image formation optical system for imaging image information of an original on a photoelectric conversion device having a plurality of pixels arranged in a one-dimensional direction, comprising:
   at least one rotation symmetric lens having a shape which is rotation symmetric with respect to an optical axis and held inside a lens barrel; and
   a rotation asymmetric lens having a rotation asymmetric shape and held outside the lens barrel,
   wherein the at least one of rotation symmetric lens and the rotation asymmetric lens are assembled so as to be mutually rotatable for adjustment, and
   wherein one direction of a refracting power of the rotation asymmetric lens of the image formation optical system is aligned with the direction of arrangement of the plurality of pixels of the photoelectric conversion device.

3. An image formation optical system according to claim 1 or to claim 2, wherein the rotation asymmetric lens has a flattening shape in outer diameter.

4. An image formation optical system according to claim 1 or to claim 2, wherein the rotation asymxnetric lens has an anamorphic surface in optical surface shape.

5. An image reading apparatus having:
   an image formation optical system for imaging image information of an original; a barrel for holding the image formation optical system; barrel supporting means for supporting the barrel; and reading means arranged in an image formation position of the image formation optical system and having a plurality of light receiving elements arranged in a one-dimensional direction, wherein the image formation optical system has at least one of rotation asymmetric lens having a rotation asymmetric shape, and a second alignment reference surface provided in the rotation asymmetric lens is brought into contact with a first alignment reference surface provided in the barrel supporting means to align certain one direction of a refracting power of the rotation asymmetric lens with the direction of arrangement of the plurality of light receiving elements, and wherein one of the alignment reference surfaces is a protruding portion, and the other of the alignment reference surfaces is a groove portion adapted to be engaged with the protruding portion.

6. An image reading apparatus according to claim 5, wherein the second alignment reference surface is a flat surface portion provided in a part of the outer peripheral portion of the rotation asymmetric lens, and the first alignment reference surface is a flat surface portion provided in a part of the barrel supporting means.

7. An image reading apparatus according to claim 5, wherein a fourth alignment reference surface provided in the rotation asymmetric lens is brought into contact with a third alignment reference surface provided in the barrel supporting means to align a direction perpendicular to the certain one direction of the refracting power of the rotation asymmetric lens with the direction of arrangement of the plurality of light receiving elements.

8. An image formation optical system for imaging image information of an original on a photoelectric conversion device having a plurality of pixels arranged in a one-dimensional direction, comprising:

an aperture stop;

a plurality of lenses arranged to image the image information on the plurality of pixels, at least one of said lenses being an anamorphic lens, and including a meniscus lens arranged adjacent to said anamorphic lens, wherein when a thickness of said anamorphic lens is $d_a$, a thickness of said meniscus lens is $d_m$, an interval between said anamorphic lens and said meniscus lens adjacent thereto is $t_{in}$, and a distance between a lens surface of the lens of both said lenses nearest said aperture stop and a lens surface of the lens, other than said lenses, facing the lens surface of the lens of both the lenses nearest the aperture stop is $t_{out}$, the following condition is satisfied:

$$t_{in} < d_m + d_a < t_{out}.$$

9. An image formation optical system according to claim 8, wherein a maximum opening angle in a ray passing area of the anamorphic lens is equal to or smaller than 40°.

10. An image formation optical system according to claim 8, wherein when a focal length of a main scanning cross section of the image formation optical system is $f_{all}$, and a maximum outer diameter of a ray passing area of the anamorphic lens is K, the following relationship is established:

$$0.3 \leq K/f_{all} \leq 1.5.$$

11. An image formation optical system according to claim 8, wherein the meniscus lens adjacent to the anamorphic lens is a meniscus-shaped lens having a negative refracting power and having a recess surface directed to the aperture stop side.

12. An image formation optical system according to claim 8, wherein a refracting power within a main scanning cross section of an anazuorphic surface of the anainorphic lens, and a refracting power within a sub-scanning cross section thereof are changed within an effective range, and when a differences between maximum values of the refractive power and minimum values of the refractive power are $\Delta\Phi_m$, and $\Delta\Phi_s$, respectively, the following condition is satisfied:

$$0.008 < \Delta\Phi_m < 0.045 \text{ and } 0.000 < \Delta\Phi_s < 0.012.$$

13. An image formation optical system according to claim 8, wherein when a focal length of a main scanning cross section of the image formation optical system is $f_{all}$, a focal length of the meniscus lens is $f_m$ and a focal length of a main scanning cross section of the anamorphic lens is $f_a$, the following condition is satisfied:

$$-1.65 < \frac{f_m}{f_{all}} < -1.20 \text{ and } 4.0 < \left|\frac{f_a}{f_m}\right| < 13.5.$$

14. An image formation optical system according to claim 8, further comprising:

a meniscus-shaped first lens having a positive refracting power and having a convex surface directed to an original side; a second lens having recess surfaces as both lens surfaces; a third lens having convex surfaces as both lens surfaces; a meniscus-shaped fourth lens having a negative refracting power and having a recess surface directed to the original side; a meniscus-shaped fifth lens having a recess surface directed to the original side; and a meniscus-shaped sixth lens having a recess surface directed to the original side in this order from the original side, wherein the ananiorphic lens is at least one of a plurality of meniscus-shaped lenses.

15. An image formation optical system according to claim 8, further comprising:

a meniscus-shaped first lens having a positive refracting power and having a convex surface directed to an original side; a second lens having recess surfaces as both lens surfaces; a third lens having convex surfaces as both lens surfaces; a meniscus-shaped fourth lens having a recess surface directed to the original side; and a meniscus-shaped fifth lens having a recess surface directed to the original side, wherein the anamorphic lens is at least one of a plurality of meniscus-shaped lenses.

16. An image formation optical system according to claim 8, wherein the anarnorphic lens is made of plastic mold, and the meniscus lens is made of glass.

17. An image reading apparatus for forming image information on a surface of reading means using the image formation optical system as claimed in claim 8.

18. A method for adjusting an image forming optical system for imaging image information of an original on a photoelectric conversion device having a plurality of pixels arranged in one-dimensional direction, comprising the step of:

assembling the image forming optical system by assembling at least a first lens barrel for holding a rotation symmetric lens having a shape which is rotation symmetric with respect to an optical axis and a second lens barrel for holding a rotation asymmetric lens having a rotation asymmetric shape, so as to mutually rotatable for adjustment, wherein the first lens barrel is rotationally adjusted while the second lens barrel remains fixed.

19. A method according to claim 18, wherein the first lens barrel is rotationally adjusted so that best image formation line due to lens decentering of the rotation symmetric lens overlaps the one-dimensional direction.

20. A method for adjusting an image forming optical system for imaging image information of an original on a photoelectric conversion device having a plurality of pixels arranged in a one-dimensional direction, comprising the step of:

assembling the image forming optical system by assembling at least a rotation symmetric lens having a shape which is rotation symmetric with respect to an optical axis, inside a lens barrel, and a rotation asymmetric lens having a rotation asymmetric shape outside the lens barrel, such that the rotation symmetric lens and the rotation asymmetric lens are mutually rotatable for adjustment, such that the rotation symmetric lens is rotationally adjusted while the rotation asymmetric lens remains fixed.

21. A method according to claim 20, wherein the rotation symmetric lens is rotationally adjusted so that best image formation line due to lens decentering of the rotation symmetric lens overlaps the one-dimensional direction.

* * * * *

UNITED STATES PATENT AND TRADEMARK OFFICE
CERTIFICATE OF CORRECTION

PATENT NO. : 6,801,375 B2
DATED : October 5, 2004
INVENTOR(S) : Tadao Hayashide

It is certified that error appears in the above-identified patent and that said Letters Patent is hereby corrected as shown below:

Column 2,
Line 18, "proposed Application" should read -- proposed in Application --; and
Line 46, "needs" should read -- need --.

Column 6,
Line 9, "a" should be deleted; and
Line 11, "$\Delta\Psi_s$," should read -- $\Delta\Phi_s$, --.

Column 12,
Line 23, "this-embodiment," should read -- this embodiment, --.

Column 13,
Line 26, "with" should be deleted.

Column 14,
Line 23, "that there" should read -- that since there --; and
Line 62, "information-formed" should read -- information formed --.

Column 18,
Line 51, "lens used" should read -- lens is used --.

Column 19,
Line 56, "Numeral" should read -- Numerical --; and
Line 67, "anamaorphic" should read -- anamorphic --.

Column 20,
Line 39, "Abb's" should read -- Abbe's --.

Column 21,
Line 5, "R4 = 45.191" should read -- R4 = 45.791 --;
Line 18, "Anamoriphic" should read -- Anamorphic --; and
Line 35, "BIO = 6.418E-13" should read -- BIO = 6.416E-13 --.

Column 25,
Line 28, "mirrors" should read -- mirror --.

Column 26,
Line 59, "asymxnetric" should read -- asymmetric --.

UNITED STATES PATENT AND TRADEMARK OFFICE
CERTIFICATE OF CORRECTION

PATENT NO. : 6,801,375 B2
DATED : October 5, 2004
INVENTOR(S) : Tadao Hayashide

It is certified that error appears in the above-identified patent and that said Letters Patent is hereby corrected as shown below:

Column 28,
Line 3, "anazuorphic" should read -- anamorphic --; and "anainorphic" should read -- anamorphic --;
Line 5, "a" should be deleted;
Line 14, "fm" should read – fm, --;
Line 35, "ananiorphic" should read -- anamorphic --;
Line 50, "anarniorphic" should read -- anamorphic --; and
Line 66, "to mutually" should read -- to be mutually --.

Signed and Sealed this

Fifth Day of April, 2005

JON W. DUDAS
*Director of the United States Patent and Trademark Office*